(12) United States Patent
Wallace et al.

(10) Patent No.: US 12,297,356 B2
(45) Date of Patent: *May 13, 2025

(54) PIGMENT DISPERSION

(71) Applicant: SWIMC LLC, Cleveland, OH (US)

(72) Inventors: David R. Wallace, Eden Prairie, MN (US); T. Howard Killilea, North Oaks, MN (US); Stephen M. Korenkiewicz, Lake Zurich, IL (US); Thomas J. Melnyk, Greenfield, MN (US); Danny G. Hartinger, Hudson, WI (US); Jason S. Ness, Woodbury, MN (US); Jacob Donlon, Prospect, KY (US); Mark R. Coward, Jeffersonville, IN (US)

(73) Assignee: SWIMC LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,825

(22) Filed: Apr. 4, 2023

(65) Prior Publication Data

US 2023/0242768 A1    Aug. 3, 2023

Related U.S. Application Data

(63) Continuation of application No. 17/097,716, filed on Nov. 13, 2020, now Pat. No. 11,655,372, which is a continuation of application No. 15/563,133, filed as application No. PCT/US2016/025752 on Apr. 1, 2016, now Pat. No. 10,836,910.

(60) Provisional application No. 62/141,710, filed on Apr. 1, 2015.

(51) Int. Cl.
| | |
|---|---|
| *C09B 67/46* | (2006.01) |
| *C09D 7/20* | (2018.01) |
| *C09D 7/61* | (2018.01) |
| *C09D 7/63* | (2018.01) |

(52) U.S. Cl.
CPC .............. *C09B 67/009* (2013.01); *C09D 7/20* (2018.01); *C09D 7/61* (2018.01); *C09D 7/63* (2018.01)

(58) Field of Classification Search
CPC ....................................................... C09D 7/20
See application file for complete search history.

(56) References Cited

U.S. PATENT DOCUMENTS

| | | | |
|---|---|---|---|
| 3,428,693 A | 2/1969 | Prosser | |
| 3,499,855 A | 3/1970 | Roper | |
| 3,759,875 A | 9/1973 | Guthrie | |
| 4,045,516 A * | 8/1977 | Morgan | C08F 8/14 522/18 |
| 4,338,171 A | 7/1982 | Barie, Jr. et al. | |
| 4,909,852 A | 3/1990 | Atkinson | |
| 5,340,394 A | 8/1994 | Elsamanoudi | |
| 5,509,960 A | 4/1996 | Simpson et al. | |
| 5,510,422 A | 4/1996 | Blankenship et al. | |
| 5,763,099 A | 6/1998 | Misev et al. | |
| 5,814,144 A | 9/1998 | Coutts et al. | |
| 5,990,260 A | 11/1999 | Pettersson | |
| 5,994,494 A | 11/1999 | Wakui | |
| 6,287,377 B1 | 9/2001 | Binns et al. | |
| 6,316,517 B1 | 11/2001 | Dones et al. | |
| 6,488,760 B1 | 12/2002 | Binns et al. | |
| 6,736,892 B2 | 5/2004 | Godwin et al. | |
| 6,762,230 B2 | 7/2004 | Brandenburger et al. | |
| 7,119,236 B2 | 10/2006 | Weerasooriya et al. | |
| 7,179,531 B2 | 2/2007 | Brown et al. | |
| 7,271,211 B2 | 9/2007 | Weipert et al. | |
| 7,317,062 B2 | 1/2008 | Pritschins et al. | |
| 7,605,209 B2 | 10/2009 | Killilea et al. | |
| 7,659,340 B2 | 2/2010 | Coward et al. | |
| 7,728,068 B2 | 6/2010 | Killilea et al. | |
| 7,812,079 B2 | 10/2010 | Brandenburger et al. | |
| 7,923,513 B2 | 4/2011 | Killilea et al. | |
| 8,106,239 B2 | 1/2012 | Zhou et al. | |
| 8,110,624 B1 | 2/2012 | Brandenburger et al. | |
| 8,141,599 B2 | 3/2012 | Korenkiewicz et al. | |
| 8,394,496 B2 | 3/2013 | Foster et al. | |
| 8,748,550 B2 | 6/2014 | Cavallin et al. | |
| 8,752,594 B2 | 6/2014 | Gebhard et al. | |
| 8,822,580 B2 | 9/2014 | Korenkiewicz et al. | |
| 9,051,341 B2 | 6/2015 | Palmer, Jr. | |

(Continued)

FOREIGN PATENT DOCUMENTS

| | | |
|---|---|---|
| EP | 1 236 777 A1 | 9/2002 |
| GB | 887394 | 1/1962 |

(Continued)

OTHER PUBLICATIONS

"Subpart D—National Volatile Organic Compound Emission Standards for Architectural Coatings," §59.400, 40 CFR CH 1, United States Environmental Protection Agency, Jul. 1, 2015 edition, 17 pgs.

ASTM D3793-06, Standard Test method for Low-Temperature Coalescence of Latex Paint Films by Porosity Measurement (Withdrawn 2012), Jul. 2, 2012.

ASTM D1210-05 (2014), "Standard Test Method for Fineness of Dispersion of Pigment-Vehicle Systems by Hegman-Type Gage," 2014; 6 pgs.

(Continued)

*Primary Examiner* — Michael F Pepitone
(74) *Attorney, Agent, or Firm* — Mueting Raasch Group

(57) ABSTRACT

Reactive liquids diluent and reactive dispersing agents for fluid concentrates, colorants and coating compositions, wherein the reactive liquid diluent and reactive dispersing agents have a viscosity less than 1,000 cps and contain at least one molecular species having at least three reactive unsaturated sites. The reactive liquid diluent or dispersing agent may be included a coating composition to form an interpenetrating polymer network in, or crosslink with, a pigmented coating composition containing a film-forming polymeric binder.

25 Claims, No Drawings

(56) References Cited

U.S. PATENT DOCUMENTS

| | | | |
|---|---|---|---|
| 10,836,910 | B2 | 11/2020 | Wallace |
| 11,655,372 | B2* | 5/2023 | Wallace .................. C09D 7/63 524/315 |
| 2004/0152830 | A1 | 8/2004 | Kim et al. |
| 2004/0220340 | A1 | 11/2004 | McAlvin et al. |
| 2007/0087146 | A1 | 4/2007 | Evans et al. |
| 2008/0008895 | A1 | 1/2008 | Gamer et al. |
| 2008/0119600 | A1 | 5/2008 | Anchor et al. |
| 2009/0004396 | A1 | 1/2009 | Wu et al. |
| 2009/0149591 | A1 | 6/2009 | Yang et al. |
| 2010/0151242 | A1 | 6/2010 | Boehm et al. |
| 2010/0249317 | A1 | 9/2010 | Killilea et al. |
| 2010/0322879 | A1 | 12/2010 | Gobelt et al. |
| 2011/0086975 | A1 | 4/2011 | Melnyk et al. |
| 2011/0120346 | A1 | 5/2011 | Reisacher et al. |
| 2012/0095128 | A1 | 4/2012 | Chakrabarti et al. |
| 2013/0047892 | A1 | 2/2013 | Palmer, Jr. |

FOREIGN PATENT DOCUMENTS

| | | |
|---|---|---|
| GB | 974892 | 11/1964 |
| WO | WO 91/06586 A1 | 5/1991 |
| WO | WO 96/26986 A1 | 9/1996 |
| WO | WO 01/44377 A1 | 6/2001 |
| WO | WO 2008/048983 A2 | 4/2008 |
| WO | WO 2009/045408 A1 | 4/2009 |
| WO | WO 2011/002474 A1 | 1/2011 |
| WO | WO 2012/170623 A1 | 12/2012 |
| WO | WO 2013/059765 A1 | 4/2013 |
| WO | WO 2013/090341 A1 | 6/2013 |
| WO | WO 2013/138209 A1 | 9/2013 |
| WO | WO 2013/169676 A1 | 11/2013 |
| WO | WO 2014/145917 A2 | 9/2014 |

OTHER PUBLICATIONS

ASTM D6886-14, "Standard Test Method for Determination of the Weight Percent Individual Volatile Organic Compounds in Waterborne Air-Dry coatings by Gas Chromatography," Jun. 15, 2014; 4 pgs.

ASTM D4946-89, "Standard Test Method for Blocking Resistance of Architectural Paints," Oct. 1990; 2 pgs.

BASF The Chemical Company—Industrial Coatings Technical Data Sheet—Laropal® A 81, 3 pages (Dec. 2010).

Lubrizol Product Guide—Hyperdispersants and Rheology Control Additives for Paints and Coatings, 16 pages (Mar. 2011).

Lubrizol Technology & Benefits—Hyperdispersants, 16 pages (Mar. 2011).

Lubrizol Product Selection Guide—Resins & Additives for Metal Protection, 12 pages (Apr. 2012).

Lubrizol, Material Safety Data Sheet for Solplus$_{TM}$R700, 8 pages (Jan. 19, 2015).

Lubrizol Solplus® R700, Technical Data Sheet, 2 pages (Mar. 2007).

Lubrizol Safety Data Sheet for Solsperse $_{TM}$64000, 9 pages (Jan. 18, 2015).

NOF Corporation, Comprehensive Catalogue, Oleo & Specialty Chemicals Division, 76 pages (Sep. 19, 2014).

Allyl Pentaerythritol, Product Data Sheet, Perstorp Winning Formulas, 1 page (Feb. 15, 2008).

Trimethylolpropane Diallyl Ether 90, Product Data Sheet, Perstorp Winning Formulas, 1 page (Feb. 15, 2008).

PureOptions™ eco-colorants, Product Brochure, BASF The Chemical Company 6 pages (Jul. 2010).

Ethox, RS Series, Product Information, 4 pages (Mar. 30, 2016).

Sigma-Aldrich® Product Specification for Pentaerythritol allyl ether, 1 page (2011).

Sigma-Aldrich® Product Specification for Di(trimethylolpropane) tetraacrylate, 1 page (2013).

Allyl Pentaerythritol Data Sheet, Perstorp, Feb. 15, 2008 (Year: 2008).

Viscosity Conversion Chart, Nordson Corporation, Dec. 2003. (Year: 2003).

Federal Public Service Ministry of Economy National Institute of Industrial Property, Office Action for Brazilian Patent Application No. BR 11 2017 020720 6, Feb. 18, 2020, 6 pages.

IP Australia, Examination Report for Australian Patent Application No. 2016243023, Aug. 31, 2020, 4 pages.

European Patent Office, Communication Pursuant to Article 94(3) EPC for European Patent Application No. 16 720 216.7, Jan. 14, 2021, 3 pages.

* cited by examiner

PIGMENT DISPERSION

CROSS-REFERENCE TO RELATED APPLICATION

This application is a continuation of U.S. application Ser. No. 17/097,716 filed on Nov. 13, 2020, issued as U.S. Pat. No. 11,655,372 and titled "PIGMENT DISPERSION," which is a continuation of U.S. application Ser. No. 15/563,133 filed on Sep. 29, 2017, now patented U.S. Pat. No. 10,836,910 and entitled "PIGMENT DISPERSION," which is the § 371 U.S. National Stage of International Application No. PCT/US2016/025752 filed on Apr. 1, 2016 and entitled "PIGMENT DISPERSION," which claims the benefit of U.S. Provisional Application Ser. No. 62/141,710 filed on Apr. 1, 2015 and entitled "REACTIVE PIGMENT DISPERSION," the disclosures of which are incorporated herein by reference in their entireties.

FIELD

This invention relates to pigment dispersions for use in colorants used in tinting paints, stains and other coating compositions.

BACKGROUND

Paints, stains and other protective, decorative or functional colored fluid coatings may be supplied in a small number of popular premixed, pretinted colors. A line of such coatings may be manufactured in a factory by combining selected powdered pigments with appropriate solvents or other liquid carrier(s), pigment wetting or dispersing agents, fluid coating binders and other coating composition adjuvants, and properly mixing the ingredients to provide a storage-stable premixed, pretinted coating composition.

In order to accommodate end user desires and to enable the matching of colors on existing coated surfaces, coating manufacturers may also or instead distribute a set of tintable base coatings (e.g., base paints) and an array of concentrated point-of sale fluid colorants via point-of-sale outlets (e.g., retail paint stores, mobile retail vehicles, hardware stores, building supply stores, warehouses and distribution centers). After consulting color charts, color chips, color displays, or an appropriate color measurement or color matching system, selected amounts of one or more fluid colorants are metered, using manual or automated colorant dispensing equipment located at the point-of-sale outlet, into a can or other container nearly filled with the base coating composition, and then mixed using a paint shaker or other mixing device. This approach can provide small batch lots of custom-tinted paint in a much larger array of colors than the limited colors available in premixed pretinted products. Alternatively, a container can be filled with the base coating composition and one or more fluid colorants at the point-of-sale outlet and mixed either during or after the filling operation.

Whether manufacturing a premixed pretinted coating composition or the colorant for use in a point-of sale custom tint system, the manufacturing process typically requires wetting a mass of dry powdered pigment particles and converting the wetted mass into a highly-loaded dispersion using suitable mixing equipment and a liquid carrier. Many pigments require the use of a wetting agent. Depending on the chosen pigment, one or more dispersing agents typically will also be employed to promote particle dispersion and separation, discourage particle agglomeration, and reduce the time required to mix the pigment or colorant with the base coating composition. Colorants may also contain other adjuvants including inert (viz., extender) pigments such as talc or kaolin clay, thickeners such as hydroxyethylcellulose to control viscosity, humectants such as polyalkylene glycols to discourage dispenser tip drying, and mildewcides or biocides to discourage microbial growth.

Many previously-used colorant adjuvants are no longer employed, or are used in reduced amounts, as they release Volatile Organic Compounds (VOCs) and in some instances Hazardous Air Pollutants (HAPs) into the atmosphere. Various National and State regulations limit overall VOC and HAP content, see for example 40 C.F.R. Part 59, National Volatile Organic Compound Emission Standards for Architectural Coatings. Considerable current research has been directed to finding new pigment wetting and dispersing agents that will work well with a limited set of acceptable carriers, and to finding lower-VOC versions of other coating system adjuvants so as not to contribute additional VOC emissions in the finished coating product. In addition, some volatile nonaqueous carriers may raise overall VOC emissions from a coating composition either during or after cure. Less volatile carriers may serve as plasticizers in the finished coating and thereby contribute to other finished coating problems including coating softness, water sensitivity, poor adhesion, or disruption in coating integrity.

From the foregoing, it will be appreciated that what remains needed in the art are improved systems for dispersing pigments into colorants and into finished coating compositions without causing undesirable finished film properties. Such systems, colorants, coating compositions and methods for their manufacture are disclosed and claimed herein.

SUMMARY OF THE INVENTION

The invention provides, in one aspect, a concentrate for use in the manufacture of fluid colorants or finished coating compositions (e.g., paints), wherein at least 95 wt. % of the concentrate is a mixture of (i) solid pigment particles with (ii) a nonvolatilizing, reactive liquid diluent having a viscosity less than 1,000 cps and containing at least one molecular species having at least three reactive unsaturated sites, wherein when the reactive liquid diluent does not by itself stably disperse the pigment particles then the concentrate also contains (iii) one or more pigment wetting or dispersing agents. The disclosed concentrates contain less than 5 wt. % of materials other than the pigment particles, reactive liquid diluent and pigment wetting or dispersing agents, and in some embodiments may consist of or consist essentially of the pigment particles, reactive liquid diluent and (if needed) the pigment wetting or dispersing agents. The concentrate accordingly contains less than 5 wt. % of film-forming polymeric binders and more preferably does not contain film-forming polymeric binders. In a factory setting, the disclosed concentrates may be diluted or "let down" with additional wetting aids or dispersing agents and with other colorant ingredients (e.g., pigments, volatile or nonvolatile carriers and other colorant adjuvants) to form an array of point-of-sale fluid colorants. The disclosed concentrates may also be let down with wetting aids or dispersing agents, other colorant ingredients, and further coating composition adjuvants such as film-forming polymeric coating binders, volatile carriers and other coating composition adjuvants to form premixed pre-tinted finished coating compositions. The concentrates thus provide useful factory intermediates that simplify manufacturing procedures and reduce required inventories of raw materials and semi-finished goods.

The invention provides, in another aspect, a fluid colorant for tinting an unpigmented or pigmented coating composition, the colorant containing less than a continuous film-forming amount of a film-forming polymeric binder, and the colorant comprising: (i) solid pigment particles dispersed in (ii) a nonvolatilizing, reactive liquid diluent having a viscosity less than 1,000 cps and containing at least one molecular species having at least three reactive unsaturated sites, wherein when the reactive liquid diluent does not by itself stably disperse the pigment particles then the colorant also contains (iii) one or more pigment wetting or dispersing agents. The disclosed colorant may consist of or consist essentially of the pigment particles, reactive liquid diluent and (if needed) the pigment wetting or dispersing agents, or may include one or more adjuvants used in colorants or in coating systems. The colorant preferably is substantially free of film-forming polymeric binders and more preferably does not contain film-forming polymeric binders. The colorant may be used for tinting paints, stains and other coating compositions in a point-of-sale outlet, or for in-plant tinting of paints, stains and other coating compositions in a factory setting.

The invention provides, in another aspect, a colored latex coating composition comprising a film-forming latex polymer binder, solid pigment particles, and a nonvolatilizing, reactive liquid diluent having a viscosity less than 1,000 cps and containing at least one molecular species having at least three reactive unsaturated sites, at least one molecular species in the reactive liquid diluent containing at least one reactive unsaturated site as well as at least one hydrophilic segment that enables such species to stably disperse the pigment particles in the coating composition. The disclosed latex coating composition may dry, cure or otherwise harden by a variety of mechanisms including one and preferably more than one of binder film coalescence and loss of a volatile carrier; radiation curing such as UV-, visible light or e-beam radiation; thermal crosslinking; chemical crosslinking; or via the operation of a catalytic component, for example a metal drier, that can catalyze reaction (e.g., chain extension or crosslinking) of unsaturation in the reactive liquid diluent or binder.

The invention provides, in another aspect, a method for making a factory intermediate concentrate, the method comprising dispersing solid pigment particles into a nonvolatilizing, reactive liquid diluent having a viscosity less than 1,000 cps and containing at least one molecular species having at least three reactive unsaturated sites, wherein when the reactive liquid diluent does not by itself stably disperse the pigment particles then the particles are dispersed in the presence of one or more pigment wetting or dispersing agents, the method forming a concentrate at least 95 wt. % of which is a mixture of the pigment particles, reactive liquid diluent and (if needed) the pigment wetting or dispersing agents, the concentrate being useful as a factory intermediate for making point-of-sale fluid colorants or premixed pretinted finished coating compositions. The concentrates made by such method contain less than 5 wt. % of materials other than the pigment particles, reactive liquid diluent and pigment wetting or dispersing agents, and in some embodiments may consist of or consist essentially of the pigment particles, reactive liquid diluent and (if needed) the pigment wetting or dispersing agents. Preferably in such method the concentrate is substantially free of film-forming polymeric binders and more preferably the concentrate does not contain film-forming polymeric binders.

The invention provides, in a further aspect, a method for making point-of-sale fluid colorants, the method comprising: dispersing solid pigment particles into a nonvolatilizing, reactive liquid diluent having a viscosity less than 1,000 cps and containing at least one molecular species having at least three reactive unsaturated sites, wherein when the reactive liquid diluent does not by itself stably disperse the pigment particles then the particles are dispersed in the presence of one or more pigment wetting or dispersing agents, the colorant containing less than a continuous film-forming amount of a film-forming polymeric binder. Preferably in such method the colorant is substantially free of film-forming polymeric binders and more preferably the colorant does not contain film-forming polymeric binders.

The present invention provides, in yet another aspect, a method for making colored fluid latex coating compositions, the method comprising forming in one or more mixing steps a dispersion containing (i) solid pigment particles, (ii) a film-forming latex polymer binder, (iii) a nonvolatilizing, reactive liquid diluent having a viscosity less than 1,000 cps and containing at least one molecular species having at least three reactive unsaturated sites, at least one molecular species in the reactive liquid diluent containing at least one reactive unsaturated site as well as at least one hydrophilic segment that enables such species to stably disperse the pigment particles in the coating composition, (iv) an optional volatile carrier, (v) a metal drier or other free radical polymerization catalyst and (vi) coating composition adjuvants.

The disclosed concentrates, fluid colorants, fluid coating compositions and methods may obviate the need to use other normally required ingredients in colorants and coating compositions, and can provide colorants and colored coating compositions having very low VOC levels as well as other highly desirable property improvements.

Definitions

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, a coating composition that contains "an" additive means that the coating composition includes "one or more" additives.

The term "automated colorant dispenser" means a dispenser that is controlled or controllable via electronically-regulated precision pumps or other electronically-regulated fluid flow management devices so as to meter quantities of one or more fluid colorants into a container for a coating composition and thereby facilitate preparation of tinted coating compositions whose tints are selected from an array of tints. A manual colorant dispenser typically lacks such pumps or other fluid flow management devices, and typically uses a hand-operated piston to dispense and meter colorant. For either automated or manual colorant dispensers, the container into which colorant is metered may already contain a base coating composition at the time of colorant addition, or the base coating composition and colorants may be added to the container concurrently or sequentially in any order.

The term "binder" means a natural or synthetic polymer suitable for use in paints and other coating compositions to form pigment-containing dried, cured or otherwise hardened coatings in which the binder may represent a continuous phase.

The term "carrier" means a volatile aqueous or organic liquid solvent or dispersant that can be used to prepare paints and other coating compositions containing suspended pigments and other suspended solid particulate materials.

The terms "color" and "colored" when used with respect to a colorant or a coating composition include not only primary hues (for example, the red, yellow and blue principal hues in the RYB color system, or the red, yellow, green, blue and purple principal hues in the Munsell color system), but also intermediate-hued, black-hued and white-hued colorants and coating compositions.

The term "color strength" refers to the value obtained using Datacolor TOOLS™ software and a Datacolor SPECTRAFLASH™ SF300 or similar spectrophotometer to measure the color strength of a paint sample applied using a 4 mil (0.1 mm) BIRD™ bar applicator to a BYK-GARDNER™ plain white chart, and using a D65 illuminant, CIE 1964 10° Standard Observer angle and reflectance mode.

The term "colorant" refers to a composition that may be added to a base coating composition (e.g., a base paint or stain) so as to alter the hue or lightness of such base coating composition, and which typically and preferably is substantially free of high molecular weight film-forming polymeric binders like those normally used in paints and other coating compositions.

The term "colorant array" refers to a collection of compatible colorants in a variety of hues including at least one white colorant, black colorant, yellow-hued colorant, green-hued colorant, blue-hued colorant and red-hued colorant, the colorants in such array having related packaging and Stock Keeping Unit ("SKU") identification and being designed to be combined, typically using a point-of-sale automated or manual colorant dispenser, with one or more compatible base coating compositions to provide an array of custom tints selectable by a painting contractor, consumer or other end user.

The term "concentrate" means a composition that may be used in a factory as an intermediate from which is made fluid colorants for use in point-of-sale dispensing equipment, or from which is made premixed pre-tinted fluid coating compositions, and which contains the disclosed solid pigment particles, the disclosed reactive liquid diluent and if needed pigment wetting or dispersing agent.

The term "crosslinking molecule" when used with respect to a molecular species in the disclosed reactive liquid diluent means a nonvolatilizing molecular species that is a liquid at room temperature and contains reactive sites capable of IPN formation in a fluid pigmented coating composition containing a film-forming polymeric binder and a volatile carrier, or capable of crosslinking such binder, but which molecular species does not by itself serve as a pigment dispersing agent that enables formation of a stable dispersion of 25 wt. % of such pigment in 50 wt. % of such carrier.

The term "custom-tinted" when used with respect to a system or method for tinting base coating compositions means that one or more colorants can be dispensed into the base coating composition and mixed to provide finished coating compositions in a wide variety of (e.g., more than 20, more than 100 or even more than 1,000) preselected formulated colors or, if desired, so dispensed and mixed to match a preexisting color.

The term "dispersion" when used with respect to a fluid concentrate, colorant or coating composition means that the concentrate, colorant or coating composition contains particles uniformly distributed in a continuous liquid phase.

The terms "extender particle" and "extender pigment" mean a particulate solid material that does not materially affect tint but can be included in a paint or other coating composition to reduce the amount of colored (viz., prime) pigment required to attain a desired tint or color strength, or for affecting other properties such as oil absorption, flatness, opacity, film strength, film hardness, corrosion resistance, film permeability or coating composition viscosity.

The term "film-forming" when used in reference to a polymeric binder means that a solution or dispersion of the polymeric binder can be coated in a thin wet layer (e.g., of about 150-200 μm thickness) on a suitable support, and dried, cured or otherwise hardened (if need be with the aid of a suitable coalescent) to form over the support a substantially continuous dry film coating layer (e.g., of about 75-100 μm thickness) containing the polymer.

The terms "fluid" and "liquid" when used in reference to a substance mean that the substance is readily flowable at room temperature (e.g., 20° C.) and with minimal or modest shear over a time period of about one minute. A fluid may also contain dispersed solid particles.

The terms "latex polymer" or "emulsion polymer" when used with respect to a waterborne particulate polymer mean the polymer is not itself capable of being dispersed into water; rather, a latex or emulsion polymer requires the presence of a secondary emulsifying agent (e.g., a surfactant, and typically present during latex polymerization) to create an emulsion of the polymer particles in water.

The terms "low temperature coalescence" and "LTC" when used in reference to a fluid coating composition containing a film-forming polymeric latex binder refer to the comparative coalescence of a series of latex paints as measured for example using ASTM D3793-06. This ASTM standard was not updated within the time period required by ASTM regulations and thus was withdrawn in 2012. The standard may exhibit some variability between results measured in different laboratories, but may nonetheless be used to compare coalescence results obtained within a single laboratory.

The term "low viscosity" means having a viscosity less than 1,000 centipoise (cps). Unless otherwise specified herein, viscosity is evaluated using a BROOKFIELD™ rotational viscometer with a No. 2 spindle at 20 rpm and 25° C.

The term "low VOC" when used with respect to colorants, paints and other coating compositions means that the colorant or coating composition contains less than about 50 g/L volatile organic compounds. VOC levels may be measured using ASTM D6886-14 with methyl palmitate as the boiling point marker.

The term "(meth)" when used as a prefix for the term "allyl" refers to both methallyl and allyl groups, and when used as a prefix for the term "acrylate" refers to both methacrylate and acrylate groups.

The term "monomer" means a reactive organic molecule that can bond covalently to other molecules or to itself to form an oligomer or a polymer containing a plurality of units (e.g., a plurality of repeating units) derived from the monomer.

The term "nonreactive" when used with respect to a carrier or other ingredient in a colorant or coating composition means that the carrier or other ingredient does not bond (e.g., covalently) with itself or with other ingredients in such colorant or coating composition during storage thereof, and in some embodiments also does not bond during drying, cure or other hardening thereof. Some ingredients (for example thermally-activated blocking agents) may be nonreactive during storage of a colorant or coating composition and become reactive during drying, cure or hardening.

The term "nonvolatilizing" when used with respect to a molecular species or other material means that it is less volatile than methyl palmitate when evaluated using ASTM D6886-14.

The term "oligomer" means a molecule of intermediate relative molecular mass, the structure of which essentially contains a small plurality of units derived, actually or conceptually, from molecules of lower relative molecular mass, and having properties that vary significantly with the removal of one or a few of the units.

The term "opaque" when used with respect to paints and other coating compositions means that the coating composition has a contrast ratio greater than 95% at a μm (4 mil) dry film thickness. The contrast ratio may be determined by dividing the L* value measured over the black portion of a BYK-Gardner opacity drawdown chart by the L* value measured over the white portion.

The term "pigment" means a natural or synthetic particulate material having light-reflective or light-absorptive characteristics and a surface energy and particle size suitable for use in coloring paints and other coating compositions, and will be construed to include both insoluble materials such as inorganic or organic powdered pigments, and soluble materials such as organic dyes.

The terms "pigment volume concentration" or "PVC" when used with respect to a coating composition containing pigment particles, the disclosed reactive liquid diluent and a film-forming polymeric binder mean the total percentage of the dried solids occupied by a recited pigment species (or if no pigment species is recited, then by all pigment species) in a cured mixture made from the film-forming polymeric binder, pigment particles, extender particles and other coating composition adjuvants in a comparison coating composition made without including the disclosed reactive liquid diluent in such mixture. The terms "critical pigment volume concentration" or "CPVC", refer to the PVC level at which there is just enough of the film-forming polymeric binder to wet all the available pigment particle surfaces. The pigment particles will accordingly be entirely surrounded by binder below the CPVC, and will not be so surrounded above the CPVC. Above CPVC, a comparison coating composition made by mixing the binder with the pigment particles, extender particles and other coating composition adjuvants but without including the disclosed reactive liquid diluent in such mixture, will form a discontinuous rather than a continuous film.

The term "point-of-sale" means a site at which custom-mixed coating compositions are tinted and mixed in small batch lots (e.g., one half pint, one pint, one quart, one liter, one gallon, four liter, five gallon or 20 liter containers, corresponding to containers from about 0.2 to 20 L) for sale to end users (e.g., painters, builders and homeowners). Representative point-of-sale outlets include retail paint stores, mobile retail vehicles, hardware stores, building supply stores (including warehouses), and distribution centers.

The terms "polymer" and "polymeric" include polymers as well as copolymers of two or more monomers, and refer to a molecule of high relative molecular mass, the structure of which essentially contains the multiple repetition of units derived, actually or conceptually, from molecules of low relative molecular mass, and having properties that do not vary significantly with the removal of one or a few of the units from such polymer.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "reactive" when used with respect to an ingredient in a colorant or coating composition means that such ingredient bonds (e.g., covalently) with itself or with other ingredients in such colorant or coating composition (e.g., during drying, cure or other hardening thereof).

The term "scaffold molecule" when used with respect to a molecular species in the disclosed reactive liquid diluent means a nonvolatilizing molecular species that is a liquid at room temperature, or a solid that when mixed with a crosslinking molecule or crosslinking molecules of such reactive liquid diluent provides a liquid mixture having a viscosity less than 1,000 cps; contains hydrophilic segments and hydrophobic segments and at least one reactive unsaturated site; and in a fluid pigmented coating composition containing a film-forming polymeric binder and a volatile carrier will serve as a pigment dispersing agent that enables formation of a stable dispersion of 25 wt. % of such pigment in 50 wt. % of such carrier. A scaffold molecule that includes at least two reactive unsaturated sites may also participate in crosslinking a polymeric film-forming binder, and may be referred to as a "crosslinking scaffold molecule".

The term "solvent-borne" when used with respect to concentrates, colorants and coating compositions means that the major liquid vehicle or carrier for such colorant, concentrate or coating composition is a nonaqueous solvent or mixture of nonaqueous solvents.

The terms "stable dispersion" and "stably disperse" refer to a dispersion that does not undergo visibly detectable phase separation if allowed to stand undisturbed in a clear mixing vessel for at least eight hours.

The term "substantially free of" when used with respect to a component which may be found in a colorant, concentrate or coating composition, means containing less than about 5 wt. % of the component based on the total composition weight.

The term "topcoat" refers to a coating composition which when dried or otherwise hardened provides a decorative or protective outermost finish layer on a coated substrate. By way of further explanation, such topcoats may be applied in one or more layers and may be applied to bare or primer-coated substrates.

The term "vinyl" when used with respect to an organic group refers to a moiety having the formula —CH=CH$_2$.

The term "water-borne" when used with respect to concentrates, colorants and coating compositions means that the major volatile liquid vehicle or carrier for such colorant, concentrate or coating composition is water.

The term "water-dispersible" when used with respect to a polymer means the polymer is itself capable of being dispersed into water without requiring the use of a separate surfactant, or water can be added to the polymer, to form a stable dispersion at normal storage temperatures. Water-dispersible polymers may include nonionic or anionic functionality on the polymer to assist in rendering the polymer water-dispersible. For such polymers, external acids or bases are typically required for anionic stabilization; however, these are not considered to be secondary emulsifying agents (e.g., surfactants) such as are used to disperse a water insoluble latex polymer into water.

DETAILED DESCRIPTION

A variety of solid pigment particles may be used in the disclosed fluid concentrates, colorants and coating compositions, and will be familiar to persons having ordinary skill in the art. Exemplary pigment particles include titanium dioxide, black iron oxide, red iron oxide, transparent red oxide, yellow iron oxide, transparent yellow oxide, brown iron oxide (a blend of red and yellow oxide with black), zinc oxide, magnesium silicates, calcium carbonate, aluminosilicates, silica and various clays, carbon black, lampblack, greens such as phthalocyanine green, blues such as phthalocyanine blue, reds (such as naphthol red, quinacridone red, toulidine red and DPP red, also known as PR254), magentas such as quinacridone magenta, violets (such as quinacridone violet and carbazole violet), oranges (such as DNA orange and DPP orange), yellows (such as monoazo yellow and bismuth vanadate yellow), umber, complex inorganic color pigments (also known as CICPs), other pigments such as those listed in U.S. Pat. No. 5,509,960 (Simpson et al.) and U.S. Pat. No. 7,179,531 B2 (Brown et al.), non-infrared-absorbing pigments such as those listed in U.S. Pat. No. 8,752,594 B2 (Gebhard et al.), and plastic pigments such as solid bead pigments (e.g., polystyrene or polyvinyl chloride beads) and microsphere pigments containing one or more voids and vesiculated polymer particles such as those discussed in U.S. Pat. No. 5,510,422 (Blankenship et al.). Representative pigment suppliers include BASF, E. I. duPont de Nemours and Company, Expancel Inc., Ferro Corporation, Fluoro-Seal Inc., Kronos, Inc., Millennium Specialty Chemicals Inc., Potter Industries Inc., Shepherd Color Company, Silbrico Corporation, Tomatec America, Inc., Trelleborg Fillite Inc., Tronox Corporation, 3M, Bunge Fertilizantes S.A. and Yianlid Industrial Co., Limited. Mixtures of pigment particles may be and often will be employed. The pigment particles may have a variety of shapes and sizes but desirably will scatter or absorb photons having wavelengths in the visible spectral region from about 380 nm to about 700 nm or in the infrared spectral region above the visible spectral region. Suitable pigment shapes include spherical shapes, such as a regular sphere, an oblate sphere, a prolate sphere, and an irregular sphere; cubic shapes such as a regular cube and a rhombus; plate-like shapes including a flat plate, a concave plate, and a convex plate; and irregular shapes. Particles having spherical shapes desirably have average diameters of about 10 nm to about 1,000 nm, e.g., at least about 100 nm or at least about 200 nm, and less than about 500 nm or less than about 300 nm. Particles having non-spherical shapes desirably have a maximum diameter of up to about 1 micrometer, e.g., up to about 500 nm or up to about 300 nm. The pigment particles may include one or more coatings, e.g., of silica, alumina, zirconia or combinations thereof such as a silica coating and an alumina coating.

The amounts of pigment in the disclosed fluid concentrates, colorants and coating compositions are best expressed by referring to volume percent pigment rather than weight percent pigment, owing to differences in density among the various pigments that typically will be employed. The pigment amount typically will also depend on the chosen pigment, owing to differences in particle size and color strength among available pigments. As a general rule however, a fluid concentrate or colorant will contain a greater concentration (for example at least twice the concentration expressed on a volume percent pigment basis) compared to the highest concentration of such pigment normally present in a finished coating composition containing such colorant. In addition, a concentrate typically will contain a greater pigment concentration and a lower concentration of water or other nonreactive carrier than the corresponding fluid colorant. In one preferred embodiment, a set of concentrates suitable for making one or more colorant arrays is prepared using pigment concentrations that are at or above the highest pigment concentrations employed for the corresponding pigment-containing colorants in such colorant arrays. In a further preferred embodiment, a set of concentrates suitable for making one or more colorant arrays is prepared using the highest pigment concentrations that will provide a stable concentrate for any chosen pigment. The pigment amounts in the disclosed fluid concentrates and colorants will to some extent also depend upon the other ingredients present and may be empirically determined. Exemplary pigment amounts for concentrates may for example at least about 40, at least about 45, or at least about 50 vol. % pigment, and up to about 70, up to about 65, or up to about 60 vol. % pigment. Suitable amounts may readily be empirically determined by persons having ordinary skill in the art by evaluating time, equipment and ingredient requirements needed to obtain satisfactory pigment dispersion from a selected concentrate, using for example the Hegman fineness of grind procedure described in ASTM D1210-05(2014).

Exemplary pigment amounts for fluid colorants are for example at least about 2, at least about 4, at least about 6, at least about 8, at least about 10 or at least about 12 vol. % pigment, and up to about 60, up to about 50, up to about 40, up to about 30, up to about 25 or up to about 20 vol. % pigment. By way of example for particular pigments used to make colorants, the disclosed fluid colorants may include about 15 to about 40 vol. % pigment for a white pigment based on titanium dioxide, about 15 to about 40 vol. % pigment for a yellow pigment based on organic yellow PY74, PY83 or PY184, about 4 to about 40 vol. % pigment for a green pigment based on phthalo green PG7, about 4 to about 30 vol. % pigment for a blue pigment based on phthalo blue PB15:2, PB15:3 or PB 15:4, about 4 to about 60 vol. % pigment for a red pigment based on PR112, PR209 or PR254 and about 4 to about 30 vol. % pigment for a magenta pigment based on PR122. Suitable amounts for colorants containing other pigments may readily be empirically determined by persons having ordinary skill in the art using appropriate drawdowns and if need be color strength measurements using the color strength test and spectrophotometer discussed above.

Exemplary pigment amounts for coating compositions may be lower than the amounts used in colorants, for example at least about 1, at least about 2, at least about 4, at least about 6, at least about 8 or at least about 10 vol. % pigment, and up to about 40, up to about 30, up to about 20, up to about 30, up to about 25 or up to about 20 vol. % pigment. Suitable amounts may readily be empirically determined by persons having ordinary skill in the art using appropriate drawdowns and if need be color strength measurements using the color strength test and spectrophotometer discussed above.

The disclosed fluid concentrates and colorants include a nonvolatilizing, reactive liquid diluent having a viscosity less than 1,000 cps and containing at least one molecular species having at least three reactive unsaturated sites. For nonvolatilizing reactive liquid diluents containing more than one molecular species, preferably less than 5 wt. % of the molecular species in such reactive liquid diluent are more volatile than methyl palmitate, and more preferably less than 4 wt. %, less than 3 wt. %, less than 2 wt. % or less than 1 wt. % of the molecular species in such reactive liquid diluent are more volatile than methyl palmitate.

The reactive liquid diluent may contain a single molecular species or a plurality of molecular species. The disclosed species each contain at least one reactive unsaturated site, and at least one molecular species in the disclosed reactive liquid diluent contains at least three reactive unsaturated sites. The disclosed reactive liquid diluent accordingly may contain a single molecular species having at least three reactive unsaturated sites, or may contain a molecular species having at least three reactive unsaturated sites mixed with one or more additional molecular species each containing at least one reactive unsaturated site. Preferably the molecular specie(s) having at least three reactive unsaturated sites represent the majority by weight, and more preferably at least 60 wt. % or at least 70 wt. %, of the reactive liquid diluent. The disclosed reactive unsaturated sites may for example be provided by allyl groups, methallyl ether groups, vinyl ether groups, acrylate groups, methacrylate groups or conjugated carbon-carbon double bonds.

Preferably a molecular species in the disclosed reactive liquid diluent contains at least four, at least five or at least six reactive unsaturated sites. For example, a reactive liquid diluent molecular species containing a conjugated carbon-carbon double bond and four allyl ether groups would be said to have five reactive unsaturated sites, with the conjugated carbon-carbon double bond being counted as one of those sites. More than six reactive unsaturated sites may be present if desired, but doing so may also cause an undesirable increase in molecular weight and viscosity, and thus embodiments having less than eight or less than seven reactive unsaturated sites may be preferred. Also, and without intending to be bound by theory, reactive liquid diluents containing molecular species with a high equivalent weight per reactive unsaturated site may provide lower hardness films or slower development of film hardness. Accordingly, molecular species in the disclosed reactive liquid diluent preferably have a molar equivalent weight per reactive unsaturated site that is less than 500 g, more preferably less than 250 g, yet more preferably less than 200 g and most preferably less than 150 g.

Preferably one or more molecular species in the disclosed reactive liquid diluent contain at least one reactive unsaturated site and one or more hydrophilic segments that enable such molecular species to serve as a pigment wetting or dispersing agent. In some embodiments, such molecular species may serve as the only required pigment wetting or dispersing agent needed to disperse solid pigment particles in a concentrate, colorant or coating composition, and accordingly may enable replacement of all or most of the conventional pigment wetting or dispersing agents used to make colorants and pigmented coating compositions. Such molecular species may also become reacted into a coating composition during the cure thereof and thereby become less likely to evolve from the coating and contribute to VOC emissions.

Preferably all the molecular species in the reactive diluent will crosslink or otherwise become reacted into a coating composition during the cure thereof, e.g., by forming or becoming part of an interpenetrating polymer network ("IPN") in a hardened film of the coating composition. In an embodiment, the reactive liquid diluent will also or instead crosslink with a suitable reactive group on a film-forming polymeric binder within such coating composition, and thereby become a part of the hardened binder.

Preferably the reactive liquid diluent has a viscosity less than 500 cps, less than cps, less than 200 cps or less than 100 cps. Molecular species in the disclosed reactive liquid diluent may have a variety of molecular weights, for example a number average molecular weight of at least about 200, at least about 400, at least about 600 or at least about 800, and up to about 3,000, up to about 2,000, up to about 1,500 or up to about 1,000.

The disclosed reactive liquid diluent preferably at least partially replaces carriers and other potentially objectionable adjuvants in colorants and coating compositions. The reactive liquid diluent accordingly may reduce VOC levels prior to or during coating composition cure, and may reduce coating plasticization after cure. Some embodiments of the disclosed reactive liquid diluent may serve as the only required medium needed to form a stable dispersion of solid pigment particles, and accordingly may enable replacement of all or most of the conventional carrier or carriers used in some colorants and pigmented coating compositions.

An array of fluid colorants containing the disclosed reactive liquid diluent can enable point-of-sale tinting of base paints and other coating compositions in a variety of hues. In embodiments in which the reactive liquid diluent is employed in a point-of-sale colorant system, the reactive liquid diluent may also assist in preventing dispenser tip drying, and accordingly may enable replacement of all or most of the conventional humectants used in such colorant systems.

Some embodiments of the disclosed reactive liquid diluent may assist in film coalescence by a pigmented latex coating composition, and accordingly may enable replacement of all or most of the conventional coalescents used in some latex coating compositions.

Some molecular species in the disclosed reactive liquid diluents may be classified as crosslinking molecules, scaffold molecules or as crosslinking scaffold molecules, In one preferred subclass representing an embodiment of a crosslinking molecule, the reactive liquid diluent may comprise, consist essentially of, or consist of a single molecular species having three or more and preferably four or more reactive unsaturated sites that can react to form the disclosed IPN or can crosslink a film-forming polymeric binder in a coating composition, but which molecular species does not by itself stably disperse pigment particles. Preferred reactive unsaturated sites in such single molecular species include (meth)allyl ether groups, vinyl ether groups and (meth)acrylate groups.

In another preferred subclass representing an embodiment of a crosslinking scaffold molecule, the reactive liquid diluent may comprise, consist essentially of, or consist of a single molecular species having at least three (and preferably at least four) reactive unsaturated sites that can react to form the disclosed IPN or can crosslink a film-forming polymeric binder in a coating composition, at least one hydrophilic segment (e.g., a polyoxyethylene segment) that enables such molecular species by itself to stably disperse pigment particles, and at least one hydrophobic segment, and having a viscosity less than 1000 cps.

In another preferred subclass representing an embodiment of a crosslinking molecule and a separate scaffold molecule, the reactive liquid diluent may comprise, consist essentially of, or consist of two or more molecular species each containing one or more reactive unsaturated sites that can participate in formation of the disclosed IPN or crosslinking of a film-forming polymeric binder, and wherein at least one molecular species has at least three (and preferably at least four) such reactive unsaturated sites but which molecular species does not by itself stably disperse pigment particles; at least one other molecular species contains at least one hydrophilic segment (e.g., a polyoxyethylene segment) that enables such other molecular species by itself to stably disperse pigment particles, and at least one hydrophobic segment; and a mixture of the molecular species in the reactive liquid diluent has a viscosity less than 1000 cps.

A variety of crosslinking molecules and scaffold molecules (including crosslinking scaffold molecules) may be used in the disclosed reactive liquid diluent. The individual molecular species preferably each have a molecular weight that is sufficiently high so that the molecular species will be nonvolatilizing, and a molecular weight that is sufficiently low so that the molecular species will have a viscosity less than 1000 cps. Preferably each such molecular species can serve as a medium in which pigment particles can be dispersed without requiring the addition of an additional volatile carrier.

When evaluated by itself, the crosslinking molecule viscosity may for example be less than 1,000 cps, less than 500 cps, less than 400 cps, less than 300 cps, less than 200 cps or less than 100 cps. In some embodiments the crosslinking molecule viscosity may be greater than 1,000 cps if the reactive liquid diluent also includes a scaffold molecule or molecules that when combined with the crosslinking molecule will provide a liquid mixture having a viscosity less than 1,000 cps. The crosslinking molecule number average molecular weight may for example be at least about 200, at least about 500 or at least about 800, and may for example be less than about 3,000, less than about 2,000, less than about 1,500 or less than about 1,000. When added to a colorant or coating composition, the crosslinking molecule preferably provides less than 50 (viz., less than 500 ppm), less than 30, less than 10 or less than 5 grams per liter VOCs, as measured using the above-mentioned ASTM D6886-14 procedure. The crosslinking molecule may, apart from any polyoxyalkylene segment(s) that may be present, be a monomer and not an oligomer or polymer, or may be a monomer or oligomer and not a polymer. The crosslinking molecule may be linear or branched (e.g., having a star structure), and may for example have 2, 3, 4, 5, 6 or more reactive unsaturated sites, with 3 or more and more preferably 4 or more such sites being preferred.

In one embodiment, the crosslinking molecule contains only carbon, hydrogen and oxygen atoms, or only carbon, hydrogen, nitrogen and oxygen atoms. In some embodiments, the crosslinking molecule does not contain hydroxyl groups or carboxylic acid groups, and in other embodiments the crosslinking molecule may contain hydroxyl groups or may contain carboxylic acid groups. In some embodiments, no other monomers or oligomers capable of crosslinking the binder are present other than the crosslinking molecule, or other than the crosslinking molecule and a crosslinking scaffold molecule. In other embodiments, one or more other monomers or oligomers capable of crosslinking the binder are present. In some embodiments, the crosslinking molecule does not contain any or all of nitrogen atoms, phosphorus atoms or sulfur atoms. In some embodiments, the crosslinking molecule contains no reactive sites other than (meth)allyl ether groups, vinyl ether groups or (meth)acrylate groups. In some embodiments, the crosslinking molecule contains no reactive sites other than allyl ether groups. In some embodiments the crosslinking molecule is not water-soluble, or is not a salt. In other embodiments, the crosslinking molecule is water-miscible or water-dispersible. If the crosslinking molecule is sufficiently water-miscible or water-dispersible to reside in the aqueous phase of a latex coating composition tinted with the disclosed fluid colorant, then the crosslinking molecule desirably will leave the aqueous phase and coalesce with the latex particles during film formation. In some embodiments the crosslinking molecule will assist in film coalescence by such latex coating compositions. Crosslinking molecules that assist in coalescence of a latex binder or other coating composition binder are especially preferred, and preferably provide at least a 10° C., and more preferably at least a 15° C., improvement in low temperature coalescence.

The crosslinking molecule preferably will solubilize or help solubilize the disclosed optional pigment wetting agents or dispersing agents if present. In some embodiments, the crosslinking molecule is useable in and compatible with universal colorants for tinting both waterborne and solvent-borne coating compositions. Although minor amounts of crosslinking molecule coloration (e.g., yellow coloration) may be permissible, especially for crosslinking molecules used to disperse yellow-hued or dark-hued colorants, the crosslinking molecule preferably is colorless. Pigment dispersions containing the crosslinking molecule preferably remain stable and non-settling when used as a colorant formulation or coating composition.

Representative crosslinking molecules include allyl ethers, methallyl ethers, vinyl ethers, acrylates, methacrylates, and mixtures thereof. Exemplary (meth)allyl ether crosslinking molecules include allyl pentaerythritol ("APE", or penta triallylether), di-(trimethylolpropane tetraallyl ether), di(trimethylolpropane tetramethallyl ether), di(pentaerythritol hexaallyl ether), di-(pentaerythritol hexamethallyl ether), pentaerythritol tetraallyl ether and pentaerythritol tetramethallyl ether. Exemplary vinyl ether crosslinking molecules include di-trimethylolpropane tetravinyl ether), di-(pentaerythritol hexavinyl ether) and pentaerythritol tetravinyl ether. Exemplary (meth)acrylate-functional crosslinking molecules include di-(trimethylolpropane tetraacrylate) and di-(trimethylolpropane tetramethacrylate). Exemplary materials that may be used as crosslinking molecules are also described in U.S. Pat. No. 7,728,068 B2 (Killilea et al. '068) and U.S. Pat. No. 7,923,513 B2 (Killilea et al. '513), where various reactive diluents are employed as reaction media during synthesis of film-forming polymeric binders. Other exemplary materials are described in British Patent No. 974,892 (Ilford), where various polyallyl ethers are combined with unsaturated polyesters to make unpigmented compositions.

Crosslinking molecules with increased molecular weights may be prepared by combining lower molecular weight monomers in a variety of ways. One convenient route involves an esterification reaction between a hydroxy-functional compound containing a suitable reactive unsaturated site or sites (e.g., a hydroxy-functional allyl ether) and an acid (preferably a di- or tri-acid) or an acid anhydride. Exemplary hydroxy-functional allyl ethers include trimethylolethane mono- and diallyl ether, trimethylolpropane mono- and diallyl ether, glycerol mono-, di- and triallyl ether, pentaerythritol mono-, di- and triallyl ether and sorbitol mono-, di-, tri-, tetra- and pentaallyl ether. Exemplary acids include maleic acid, fumaric acid, phthalic acid, 5-nitroisophthalic acid, 5-sodiosulfoisophthalic acid, isophthalic acid, terephthalic acid, 2-nitroterephthalic acid, itaconic acid, oxalic acid, malonic acid, succinic acid, 2-methyl butanedioic acid, glutaric acid, adipic acid, citric acid, 2,4-dimethyl hexanedioic acid, pimelic acid, suberic acid, azelaic acid, sebacic acid, 5-norbornene-2,3-di-carboxylic acid, mesaconic acid, citraconic acid, chloromaleic acid, naphthalene dicarboxylic acid, 1,2,3-benzenetricarboxylic acid, 1,2,4-benzenetricarboxylic acid, dimer fatty acid, trimer fatty acid, and other acids that will be familiar to persons having ordinary skill in the art. Exemplary acid anhydrides include maleic anhydride, phthalic anhydride, tetrahydrophthalic anhydride, hexahydrophthalic anhydride, methylhexahydrophthalic anhydride, trimellitic anhydride, pyromellitic anhydride, succinic anhydride, glutaric anhydride, β-methylglutaric anhydride, chlorendic anhydride, and other acid anhydrides that will be familiar to persons having ordinary skill in the art. The ingredients may be combined using esterification procedures and equipment that will be familiar to persons having ordinary skill in the art. When the reactants are liquids, they may simply be mixed in a suitably equipped reactor and heated for a sufficient time and temperature, under a stream of inert gas, until the desired degree of esterification has taken place, as measured by the amount of water taken off from the condensation reaction or by an acid value titration. If either reactant is a solid, it generally will also be desirable to first heat the reaction mixture to liquefy the solid reactants. At the conclusion of the reaction, it may be desirable to remove volatile unreacted starting materials or volatile nonfunctional side products using for example vacuum stripping. Doing so may reduce the likelihood that such starting materials or side products will contribute to VOCs in the fluid colorant composition or finished coating composition.

Another route for making crosslinking molecules with increased molecular weights involves reacting an allyl chloride with a di- or higher-hydroxyl-functional monomer, as described for example in the above-mentioned British Patent No. 974,892 (Ilford).

In one embodiment, the resulting increased molecular weight crosslinking molecule has a central segment derived from an aromatic, aliphatic or cycloaliphatic polyacid (e.g. a diacid, triacid or tetraacid) or acid anhydride, with the central segment being linked to 2, 3, 4 or more pendant reactive unsaturated sites. In a further embodiment, the crosslinking molecule contains a segment derived from an aromatic, aliphatic or cycloaliphatic polyacid or acid anhydride, 2, 3, 4 or more pendant reactive unsaturated sites, and substantially no other monomer residues. In a particularly preferred embodiment, the crosslinking molecule is made by reacting a diallyl ether with succinic acid, succinic anhydride, isophthalic acid or isophthalic anhydride to provide a tetrafunctional crosslinking molecule containing four allyl ether groups.

The synthetic routes and reactants described above for making allyl ether-functional crosslinking molecules may readily be adapted using techniques that will be familiar to persons having ordinary skill in the art to make vinyl ether functional or (meth)acrylate functional crosslinking molecules having increased molecular weights.

The crosslinking molecule amounts in the disclosed fluid concentrates and colorants will to some extent depend upon the other ingredients present and may be empirically determined. Exemplary crosslinking molecule amounts are about 1 to about 60 wt. % crosslinking molecule based on the total fluid concentrate or colorant weight.

A variety of scaffold molecules (including crosslinking scaffold molecules) may be used in the disclosed reactive liquid diluent. Preferably the scaffold molecule has a molecular weight sufficiently high so that the scaffold molecule will be nonvolatilizing, and a molecular weight sufficiently low so that the scaffold molecule can serve (or participate in serving) as a dispersing medium for the pigment particles and without requiring an additional volatile carrier. The scaffold molecule viscosity may for example be less than 1,000 cps, less than 500 cps, less than 300 cps, less than 200 cps or less than cps. In some embodiments the scaffold molecule viscosity may be greater than 1,000 cps if the reactive liquid diluent also includes a crosslinking molecule or molecules that when combined with the scaffold molecule will provide a liquid mixture having a viscosity less than 1,000 cps. The scaffold molecule number average molecular weight may for example be at least about 200, at least about 500 or at least about 800, and may for example be less than about 3,000, less than about 2,000, less than about 1,500 or less than about 1,000. When added to a colorant or coating composition, the scaffold molecule preferably provides less than 50, less than 30, less than 10 or less than 5 grams per liter VOCs, as measured using the above-mentioned ASTM D6886-14 procedure. The scaffold molecule may be linear or branched (e.g., having a star structure). The scaffold molecule preferably has low or no crystallinity at the desired fluid concentrate or colorant manufacturing or use temperatures (e.g., room temperature), as crystallization may lead to increased viscosity or solidification of the scaffold molecule. Scaffold molecules containing polyoxyalkylene segments with molecular weights of 1,000 or more may have reduced tendency to solidify at room temperature if they have a branched rather than linear structure.

In one embodiment, the scaffold molecule contains only carbon, hydrogen and oxygen atoms, or only carbon, hydrogen, nitrogen and oxygen atoms. In some embodiments, the scaffold molecule does not contain hydroxyl groups or carboxylic acid groups, and in other embodiments the scaffold molecule may contain hydroxyl groups, carboxylic acid groups or both hydroxyl groups and carboxylic acid groups. In some embodiments, the scaffold molecule does not contain any or all of nitrogen atoms, phosphorus atoms or sulfur atoms. The scaffold molecule may comprise, consist essentially of, or consist of one or more hydrophilic portions (e.g., polyoxyethylene segments) and one or more hydrophobic portions (e.g., saturated or polyunsaturated segments). The scaffold molecule may, apart from any polyoxyalkylene segment(s), be a monomer and not an oligomer or polymer, or may be a monomer or oligomer and not a polymer. In one embodiment, the scaffold molecule contains 2, 3 or 4 sites of ethylenic unsaturation and 1 to 4 polyoxyalkylene segments. In another embodiment, the scaffold molecule contains no reactive sites aside from the sites of ethylenic unsaturation. In yet another embodiment, the scaffold molecule contains two or more conjugated carbon-carbon double bonds.

In some embodiments, the scaffold molecule is water-miscible or water-dispersible. In some embodiments, the scaffold molecule will solubilize or help solubilize the optional pigment wetting agents or dispersing agents if present. In some embodiments, the scaffold molecule may become anchored to pigment particles and thus may behave like a conventional pigment-affinic dispersing agent. In some embodiments, both the scaffold molecule and an optional conventional pigment dispersing agent will become anchored to pigment particles. The scaffold molecule may also serve as a humectant, especially when the scaffold molecule contains sufficient polyoxyethylene content. In some embodiments, the scaffold molecule will be useable in and compatible with universal colorants for tinting both waterborne and solvent-borne coating compositions. Although minor amounts of scaffold molecule coloration (e.g., yellow coloration) may be permissible, especially for scaffold molecules used in yellow-hued or dark-hued colorants, the scaffold molecule preferably is essentially colorless. Pigment dispersions containing the scaffold molecule preferably remain stable and non-settling when used as a colorant formulation or coating composition.

The scaffold molecule may contain a variety of polyoxyalkylene segments, for example ethylene oxide, propylene oxide, ethylene oxide/propylene oxide, polyoxyethylene or polyoxypropylene segments, with polyoxyethylene segments being preferred. The polyoxyalkylene segments may for example contain at least one, at least two, at least three, at least four or at least five alkyleneoxy moieties, and may for example contain up to about 20, up to about 18 or up to about 15 alkyleneoxy moieties. The desired number of alkyleneoxy moieties may be determined empirically. As a general guide, sufficient alkyleneoxy moieties should be present so as to provide good pigment affinity. In addition, it is desirable to avoid using so many alkyleneoxy moieties that the scaffold molecule forms a solid rather than a liquid at the desired fluid concentrate or colorant manufacturing or use temperatures. In some embodiments, the polyoxyalkylene segments have a number average molecular weight of about 44 to about 2,000 or about to about 1,200.

The scaffold molecule may contain a variety of hydrophobic segments. In preferred embodiments the hydrophobic segments also contain conjugated carbon-carbon double bonds. Such segments may for example be derived from linear or branched polyunsaturated aliphatic compounds having at least one conjugated carbon-carbon double bond. The conjugated carbon-carbon double bond may be but need not be pendant with respect to the hydrophobic segment and may for example instead be located along a backbone chain.

In one exemplary embodiment, the scaffold molecule has a linear polyoxyalkylene central segment (for example, a polyoxyethylene segment) joined by one or more ester linkages to one or more pendant unsaturated fatty acid residues. Thus for example the scaffold molecule may be an alkoxylated (e.g., ethoxylated) diester of a monounsaturated fatty acid, or may be an alkoxylated (e.g. ethoxylated) monoester of a polyunsaturated fatty acid. In another embodiment, the scaffold molecule has a branched central segment (for example, a residue of a tri- or higher-functional alcohol such as trimethylolpropane, pentaerythritol, dipentaerythritol, sorbitol or glycerol) joined by polyoxyalkylene segments and ester linkages to three or more pendant unsaturated fatty acid residues.

Scaffold molecules that are also crosslinking scaffold molecules are especially preferred. Exemplary such molecules may for example be made via a straightforward and easily controllable esterification reaction between a variety of glycols, glycol ethers or alkoxylated alcohols and a variety of unsaturated acids having two or more conjugated backbone double bonds. In the resulting crosslinking scaffold molecules, a hydrophilic polyoxyalkylene segment will be joined to polyunsaturated hydrophobic segments via one or more ester linkages. Exemplary glycols and glycol ethers include ethylene glycol, di ethylene glycol, tri ethylene glycol, propylene glycol, dipropylene glycol, tripropylene glycol ethylene glycol methyl ether, diethylene glycol methyl ether, triethylene glycol methyl ether and higher alkyl ether analogs of these alcohols such as their ethyl ether, propyl ether, butyl ether and 2-ethyl hexyl ether analogs. Exemplary alkoxylated alcohols include polyethylene glycols such as PEG 300, PEG 400, PEG 600, PEG 800 and PEG 1000, methoxy polyethylene glycols such as MPEG 350, MPEG 500, MPEG550 and MPEG 750 and propylene glycols such as PPG-9 and PPG-10, all of which are available from Dow Chemical Company. A variety of tri- and higher-functional alkoxylated alcohols may also be employed, such as alkoxylated alcohols derived from trimethylolpropane, pentaerythritol, dipentaerythritol, sorbitol or glycerol. Exemplary such tri- and higher-functional alkoxylated alcohols include PLURIOL™ E 300, E 400, E and other PLURACOL E series alcohols (all available from BASF); Polyol 3165, Polyol 3940 and other 3000 series trifunctional alkoxylated polyols (all available from Perstorp), and Polyol 4360, Polyol 4640 and other 4000 series tetrafunctional alkoxylated polyols (also available from Perstorp).

Polyunsaturated fatty acids are widely available at relatively low cost, and thus provide an especially convenient source for making crosslinking scaffold molecules. The polyunsaturated acid may be aliphatic, cycloaliphatic, aromatic or combination thereof. Exemplary polyunsaturated acids include omega-3 polyunsaturated fatty acids such as hexadecatrienoic acid (all-cis 7,10,13-hexadecatrienoic acid), alpha-linolenic acid (all-cis-9,12,15-octadecatrienoic acid), stearidonic acid (all-cis-6,9,12,15,-octadecatetraenoic acid), eicosatrienoic acid (all-cis-11,14,17-eicosatrienoic acid), eicosatetraenoic acid (all-cis-8,11,14,17-eicosatetraenoic acid), eicosapentaenoic acid (all-cis-5,8,11,14,17-eicosapentaenoic acid), heneicosapentaenoic acid (all-cis-6,9,12,15,18-heneicosapentaenoic acid), docosapentaenoic acid (all-cis-7,10,13,16,19-docosapentaenoic acid), docosahexaenoic acid (all-cis-4,7,10,13,16,19-docosahexaenoic acid), tetracosapentaenoic acid (all-cis-9,12,15,18,21-tetracosapentaenoic acid) and tetracosahexaenoic acid (all-cis-6,9,12,15,18,21-tetracosahexaenoic acid); omega-6 polyunsaturated fatty acids such as linoleic acid (all-cis-9,12-octadecadienoic acid), linoelaidic acid ($CH_3(CH_2)_4CH=CHCH_2CH=CH(CH_2)_7COOH$), gamma-linolenic acid (all-cis-6,9,12-octadecatrienoic acid), eicosadienoic acid (all-cis-11,14-eicosadienoic acid), dihomo-gamma-linolenic acid (all-cis-8,11,14-eicosatrienoic acid), arachidonic acid (all-cis-5,8,11,14-eicosatetraenoic acid), docosadienoic acid (all-cis-13,16-docosadienoic acid), adrenic acid (all-cis-7,10,13,16-docosatetraenoic acid), docosapentaenoic acid (all-cis-4,7,10,13,16-docosapentaenoic acid), tetracosatetraenoic acid (all-cis-9,12,15,18-tetracosatetraenoic acid) and tetracosapentaenoic acid (all-cis-6,9,12,15,18-tetracosapentaenoic acid); omega-9 polyunsaturated fatty acids such as Mead acid (all-cis-5,8,11-eicosatrienoic acid); and other polyunsaturated fatty acids such as rumenic acid (9Z,11E-octadeca-9,11-dienoic acid), 10E,12Z-octadeca-9,11-dienoic acid, α-calendic acid (8E,10E,12Z-octadecatrienoic acid), β-calendic acid (8E,10E,12E-octadecatrienoic acid), jacaric acid (8Z,10E,12Z-octadecatrienoic acid), α-eleostearic acid (9Z,11E,13E-octadeca-9,11,13-trienoic acid), β-eleostearic acid (9E,11E,13E-octadeca-9,11,13-trienoic acid), catalpic acid (9Z,11Z,13E-octadeca-9,11,13-trienoic acid), punicic acid (9Z,11E,13Z-octadeca-9,11,13-trienoic acid), rumelenic acid (9E,11Z,15E-octadeca-9,11,15-trienoic acid), α-parinaric acid (9E,11Z,13Z,15E-octadeca-9,11,13,15-tetraenoic acid), β-parinaric acid (all trans-octadeca-9,11,13,15-tretraenoic acid), bosseopentaenoic acid (5Z,8Z,10E,12E,14Z-eicosanoic acid), pinolenic acid ((5Z,9Z,12Z)-octadeca-5,9,12-trienoic acid), podocarpic acid ((5Z,11Z,14Z)-eicosa-5,11,14-trienoic acid), sorbic acid (2,4-hexadienoic acid), abietic acid ((1R,4aR,4bR,10aR)-7-isopropyl-1,4a-dimethyl-1,2,3,4,4a,4b,5,6,10,10a-decahydrophenanthrene-1-carboxylic acid) and mixtures thereof.

A variety of monounsaturated acids may also be used to prepare dimerized or higher (e.g., branched) scaffold molecules, including diester or triester scaffold molecules.

Exemplary monounsaturated acids may be aliphatic, cycloaliphatic, aromatic or combination thereof, and include elaidic acid ($CH_3(CH_2)_7CH=CH(CH_2)_7COOH$), erucic acid ($CH_3(CH_2)_7CH=CH(CH_2)_{11}COOH$), myristoleic acid ($CH_3(CH_2)_3CH=CH(CH_2)_7COOH$), oleic acid ($CH_3(CH_2)_7CH=CH(CH_2)_7COOH$), palmitoleic acid ($CH_3(CH_2)_5CH=CH(CH_2)_7COOH$), sapienic acid ($CH_3(CH_2)_8CH=CH(CH_2)_4COOH$), vaccenic acid ($CH_3(CH_2)_5CH=CH(CH_2)_9COOH$) and mixtures thereof.

A variety of natural products or derivatives thereof that are rich in polyunsaturated or monounsaturated acids may also be employed to prepare scaffold molecules. Exemplary such natural products or derivatives include canola oil, castor oil, corn oil, cottonseed oil, hemp oil, fish oil, gum rosin and maleinized gum rosin, linseed oil, oiticica oil, safflower oil, soybean oil, sunflower oil, tall oil fatty acid, tung oil, wheat germ oil and mixtures thereof.

Esterification procedures and equipment like those discussed above in connection with the crosslinking molecule may be employed to make scaffold molecules and crosslinking scaffold molecules. Other synthetic routes for making scaffold molecules, such as molecules with ether linkages, amide linkages or other linkages between the hydrophilic and hydrophobic segments may also be employed, and will be familiar to persons having ordinary skill in the art. For example, polyunsaturated fatty alcohols provide an alternative source for making scaffold molecules. Such alcohols can be alkoxylated (e.g., ethoxylated using for example ethylene oxide) with appropriate reaction conditions and catalysts to provide a polyunsaturated fatty alcohol alkoxylate crosslinking scaffold molecule having a hydrophilic polyoxyalkylene segment joined via an ether linkage to a polyunsaturated hydrophobic segment.

Polyunsaturated fatty amines provide yet another source for making scaffold molecules. Such amines can be alkoxylated (e.g., ethoxylated using for example ethylene oxide) with appropriate reaction conditions and catalysts to provide polyunsaturated fatty amine alkoxylate crosslinking scaffold molecules having a hydrophilic polyoxyalkylene segment joined via a secondary amine linkage to a polyunsaturated segment derived from the fatty amine.

The scaffold molecule amounts in the disclosed fluid concentrates and colorants will to some extent depend upon the other ingredients present and may be empirically determined. Exemplary scaffold molecule amounts are about 1 to about 40 wt. % scaffold molecule based on the total concentrate or colorant weight.

Crosslinking scaffold molecules containing at least one hydrophilic polyoxyalkylene segment, one or more hydrophobic segments (optionally and preferably a polyunsaturated hydrophobic segment), and two or more and preferably four or more (meth)allyl ether, vinyl ether or (meth)acrylate reactive sites, and having a viscosity less than 1,000 cps, represent particularly preferred reactive liquid diluents. They may be used by themselves to provide a reactive liquid diluent containing a single molecular species, or may be used in combination with the above-mentioned crosslinking molecules or the above-mentioned scaffold molecules to provide a reactive liquid diluent containing more than one molecular species. For example, a crosslinking scaffold molecule reactive liquid diluent that contains polyoxyethylene segments to promote pigment dispersion and polyunsaturated segments and allyl ether groups to enable IPN formation or crosslinking may be made via the esterification of two or more moles of a polycarboxylic acid or anhydride with one or more moles of a polyalkylene glycol (e.g., polyethylene glycol) of suitable molecular weight, two or more moles of a hydroxyl-functional mono- or preferably polyfunctional allyl ether, and one or more moles of a polyunsaturated fatty acid, to make a reactive liquid diluent containing a hydrophilic polyoxyalkylene segment joined by ester linkages to two or more allyl ether groups and to one or more hydrophobic segments containing a reactive unsaturated site in the form of a conjugated carbon-carbon double bond. The reaction conditions for this and other reactive liquid diluents desirably are controlled so as to provide products with low molecular weight, viscosity less than 1,000 cps, and the capability to provide an IPN or crosslinking in coating compositions. Factors including the final viscosity, molecular weight, number of alkyleneoxy units, type and number of unsaturated sites and the type and number of other reactive sites (e.g., allyl ether, vinyl ether or (meth)acrylate groups) may be varied to obtain good pigment dispersing properties while maintaining low volatility and the ability to form an IPN or crosslink with the binder, and while avoiding plasticization of a coating film containing the reactive liquid diluent.

Exemplary crosslinking scaffold molecules may also be prepared by modifying the reactive surfactants shown in U.S. Pat. No. 9,051,341 B2 (Palmer, Jr.) for use in emulsion polymerization. Preferred materials will employ greater allyl group functionality and lower viscosity and equivalent weight per allyl group than the materials made in Palmer, Jr.

The reactive liquid diluent may for example represent at least about 10, at least about 20 or at least about 30 wt. % of a concentrate; at least about 1, at least about 5 or at least about 10 wt. % of a colorant; and at least about 1, at least about 5 or at least about 10 wt. % of a coating composition. The reactive liquid diluent may for example also represent less than about 70, less than about 60 or less than about 50 wt. % of a concentrate; less than about 60, less than about 50 or less than about 40 wt. % of a colorant; and less than about 60, less than about 50 or less than about 40 wt. % of a coating composition. As noted above, the molecular specie(s) in the reactive liquid diluent having at least three reactive unsaturated sites preferably represent the majority by weight, and more preferably at least 60 wt. % or at least 70 wt. %, of the reactive liquid diluent.

A variety of conventional pigment wetting or dispersing agents may optionally be used in the disclosed fluid concentrates and colorants (viz., as the pigment wetting or dispersing agent if the reactive liquid diluent does not stably disperse pigment, or as an added pigment wetting or dispersing agent if the reactive liquid diluent does disperse pigment). The disclosed fluid concentrates and colorants may contain conventional pigment wetting agents but not conventional pigment dispersing agents; conventional pigment dispersing agents but not conventional pigment wetting agents; or both conventional pigment wetting agents and conventional pigment dispersing agents. Mixtures of more than one pigment wetting agent or more than one pigment dispersing agent may be employed. Exemplary conventional pigment wetting agents typically are low molecular weight monomeric surfactants (for example, anionic, cationic or amphoteric surfactants), and exemplary conventional pigment dispersing agents typically are higher molecular weight surface-active or pigment particle affinic polymers (for example, polyelectrolyte dispersants such as maleic acid copolymers, and polyurethanes or polyacrylates containing carboxylic acid, amine or isocyanate pigment affinic anchor groups). Preferably the pigment wetting or dispersing agent is a so-called 100% solids material (viz., it may be a liquid or a solid but is not supplied in a carrier and in particular does not contain VOCs) and more preferably the pigment wetting or dispersing agent is a liquid having a viscosity no greater than 4,000 cps, no greater than 2,000 cps, no greater than 1,000 cps, no greater than 500 cps or no greater than 300 cps.

Representative pigment wetting agents are available from a variety of suppliers including Air Products and Chemicals (e.g., CARBOWET™ GA-210 surfactant which has a viscosity of 80 cps, CARBOWET GA-221 surfactant which has a viscosity of 100 cps, DYNOL™ 607 superwetter which has a viscosity of 205 cps and DYNOL 800 superwetter which has a viscosity of 230 cps); Dow Chemical Co (e.g., CAPSTONE™ fluorosurfactants FS 31, FS 34, FS 35, FS 61 and FS 64); and Stepan Company (e.g., STEPWET™ DOS-70 surfactant which contains 70% active ingredients and has a viscosity of 200 cps, and STEPWET DOS-70EA surfactant which contains 70% active ingredients and has a viscosity of 220 cps).

Representative pigment dispersing agents are also available from a variety of suppliers, and include various non-ionic (e.g., ethoxylated) and anionic (e.g., non-ethoxylated salt) forms including agents from Air Products and Chemicals, Inc. (e.g., SURFYNOL™ PSA336); Archer Daniels Midland Co. (e.g., ULTRALEC™ F deoiled lecithin); Ashland Inc. (e.g., NEKAL™ WS-25-I, which is a sodium bis(2,6-dimethyl 4heptyl)sulfosuccinate); BASF (e.g., DISPEX™ AA 4144, DISPEX ULTRA FA 4425 which is a fatty acid-modified emulsifier having a viscosity of 40,000 cps, DISPEX ULTRA FA 4420 which is a fatty acid-modified emulsifier and a dark brown liquid of unspecified viscosity, DISPEX ULTRA FA 4431 which is an aliphatic polyether with acidic groups having a viscosity of 350 cps, DISPEX ULTRA PA 4501 which is a fatty acid modified polymer having a viscosity of 10,000 cps, DISPEX ULTRA PA 4510, EFKA™ PU 4010, EFKA PU 4047 which is a modified polyurethane, EFKA PX 4300, EFKA ULTRA PA 4510 and EFKA ULTRA PA 4530 which are modified polyacrylates, EFKA FA 4620 which is an acidic polyether having a viscosity of 1,400 cps, EFKA FA which is an unsaturated polyamide and acid ester salt having a viscosity of 2,000 cps, HYDROPALAT™ WE 3135, HYDROPALAT WE 3136 and HYDROPALAT WE 3317 which are difunctional block copolymer surfactants terminating in primary hydroxyl groups and having respective viscosities of 375, 450 and 600 cps, and TETRONIC™ 901 and TERTRONIC 904 which are tetrafunctional block copolymers terminating in primary hydroxyl groups and having respective viscosities of 700 and 320 cps); Borchers (e.g., BORCHI™ Gen 0451 which is a polyurethane oligomer having a viscosity of about 30,000 cps, BORCHI Gen 0652 which is an amine neutralized acrylic acid copolymer having a viscosity of about 75-300 cps, and BORCHI Gen 1252 and BORCHI Gen 1253 which are acrylic ester copolymers having respective viscosities of about 1,500-3,500 and 50-300 cps); Byk-Chemie (e.g., BYK™ 156 which is a solution of an ammonium salt of an acrylate copolymer, DISPERBYK™ which is a solution of an alkyl ammonium salt of a low-molecular-weight polycarboxylic acid polymer, DISPERBYK-102 which is an acidic copolymer, DISPERBYK™-145 which is a phosphoric ester salt of a high molecular copolymer with pigment affinic groups and a liquid of unspecified viscosity, DISPERBYK-190 which is a solution of a high molecular weight block copolymer with pigment affinic groups, DISPERBYK-2013 which is a structured copolymer with pigment affinic groups having a viscosity of 8,600 cps, DISPERBYK-2055 which is a copolymer with pigment affinic groups and a liquid of unspecified viscosity, DISPERBYK-2060 which is a solution of a copolymer with pigment affinic groups having a viscosity of 3,600 cps, DISPERBYK-2061 which is a solution of a copolymer with pigment affinic groups having a viscosity of 491 cps, DISPERBYK-2091, DISPERBYK-2200 which is a high molecular weight copolymer with pigment affinic groups sold in solid form as pastilles and BYKJET™-9152 which is a copolymer with pigment affinic groups having a viscosity of 21,600 cps); Clariant (e.g., DISPERSOGEN™ 1728 which is an aqueous solution of a novolac derivative having a viscosity of 4,000 cps, DISPEROGEN 2774 which is a novolac alkoxylate having a viscosity of 4,000 cps, GENAPOL™ X 1003 and GENAPOL X 1005 which are fatty alcohol ethoxylates having respective viscosities of about 400 cps and 1,300 cps, HOSTAPAL BV concentrate which is a sulfate ester having a viscosity of about 2,700 cps); Cray Valley (e.g., SMA1440H which is an ammonia salt of a styrene maleic anhydride copolymer solution); Dow Chemical Co. (e.g., the TAMOL™ family of dispersants including TAMOL 165A and TAMOL 731A); Elementis (e.g., NUOSPERSE™ FA196 which has a viscosity of 1,200 cps); Lubrizol (e.g., SOLSPERSE™ 27000, SOLSPERSE 28000, SOLSPERSE 32000, SOLSPERSE 39000, SOLSPERSE 64000, SOLSPERSE 65000, SOLSPERSE 66000, SOLSPERSE 71000, SOLSPERSE M387, SOLPLUS™ R700 and SOLPLUS K500); Ethox Chemicals, LLC (e.g., the E-SPERSE™ family of dispersants and ETHOX™ 4658); Evonik (e.g., TEGO™ DISPERS 656, TEGO DISPERS 685, TEGO DISPERS 750W and TEGO DISPERS 757W); Rhodia Solvay Group (e.g., ABEX 2514 and ABEX 2525 which are nonionic surfactants, RHODACAL™ IPAM which is isopropyl amine dodecylbenzene sulfonate having a viscosity of 10,000 cps, RHODAFAC™ RS-710 which is a polyoxyethylene tridecyl phosphate ester, and the RHODOLINE™ family of dispersants including RHODOLINE 4170 and RHODOLINE 4188); Sasol Wax GmbH (e.g., ADSPERSE™ 100, ADSPERSE 500 and ADSPERSE 868) and Stepan Company (e.g., G-3300 which is an isopropyl amine salt of an alkyl aryl sulfonate having a viscosity of about 6000 cps, POLYSTEP™ A-15 which is a sodium dodecylbenzene sulfonate having a viscosity of about 85 cps, POLY STEP B-11 and POLY STEP B-23 which are ethoxylated ammonium lauryl ether sulfates respectively containing 4 or 12 moles of ethylene oxide and having respective viscosities of 66 and 42 cps, and POLYSTEP B-24 which is sodium lauryl sulfate having a viscosity of 100 cps).

The optional conventional wetting agent or dispersing agent amounts in the disclosed fluid concentrates and colorants may as noted above depend on whether the disclosed reactive liquid diluent will by itself also stably disperse the pigment particles, may also depend upon the other ingredients present, and may be empirically determined. The chosen amounts typically will vary depending upon on the actual surface area of the pigment particles or combination of pigment particles to be wetted or dispersed. As a general rule, the smaller the pigment particle size, the higher the actual surface area, hence the larger the total pigment surface area over which the wetting or dispersing agent may need to be distributed. A curve may be plotted to measure the reduction in viscosity as a wetting agent or dispersing agent is added incrementally to a pigment slurry, with the minimum viscosity indicating a recommended dosage level. Alternatively, or as a starting guide, exemplary pigment wetting agent or dispersing agent amounts are about 5 to about 115 wt. % wetting agent or dispersing agent based on pigment weight.

The disclosed fluid concentrates and colorants and their associated methods may contain or employ (but need not contain or employ) other ingredients, and may instead consist of or consist essentially of pigment particles, the reactive liquid diluent and optional additional pigment wetting or dispersing agents. The concentrates and some embodiments of the colorants may preferably contain less than about 2 wt. %, less than about 1 wt. %, less than about 500 ppm, less than about 100 ppm, or less than about 10 ppm of other ingredients based on the concentrate or colorant composition weight.

The disclosed concentrates and colorants may optionally contain (and their associated methods may optionally employ) water or other carriers. Preferably water and other carriers are not present in the concentrates so as to provide a high pigment content and to afford greater flexibility when making downstream products. Water, if used, may be tap, deionized, distilled, reverse osmosis or recycled water. Exemplary water amounts are for example about 1 to less than 5 wt. % of a concentrate and about 1 to about 50 wt. % of a colorant, and with amounts in colorants preferably being less than 15 wt. %, less than 10 wt. % or less than 5 wt. %. Exemplary other carriers include alcohols (e.g., ethanol); esters (e.g., butyl acetate, methoxypropyl acetate and propylene glycol monomethyl ether acetate); ketones (e.g., acetone, methyl ethyl ketone, methyl isoamyl ketone and methyl isobutyl ketone; ester/ketone mixtures (e.g., ethyl 3-ethoxypropionate/methyl ethyl ketone mixtures); UV curable monomers (e.g., acrylate or vinyl ether monomers); aliphatic solvents (e.g., white spirit, mineral spirit, petroleum distillates, paraffin solvent or vegetable oils); aromatic solvents (e.g., toluene, xylene, Aromatic 100 and other naphtha solvents); mixtures of aromatic solvents and ethers; and universal solvents that will work with both latex and oil-based paints (e.g., ethylene glycol, propylene glycol, hexylene glycol and glycol/water mixtures). Such other carriers, if used, preferably are used in very low amounts (e.g. less than 5 wt. %, no more than 2 wt. % or no more than 1 wt. % of the fluid concentrate or colorant) so as to minimize VOC emissions and avoid plasticization of coating composition films.

When molecular species in the disclosed reactive liquid diluent system (e.g., when a crosslinking molecule and scaffold molecule are mixed with one another), the molecular species preferably form a uniform mixture that is a Newtonian liquid at room temperature. When reactive liquid diluent containing a single molecular species is employed, it likewise preferably is a Newtonian liquid at room temperature. A mixture of reactive liquid diluent molecular species, or a reactive liquid diluent containing only a single molecular species, preferably has a viscosity less than 500 cps, and more preferably less than 300 cps, less than 200 cps or less than 100 cps.

When compared to traditional colorant dispersant blends containing a mixture of a polyethylene glycol and an alcohol ethoxylate surfactant, the reactive liquid diluent preferably provides an improvement in one or more of VOC reduction, pigment fineness of grind, colorant dispenser tip drying resistance, freeze-thaw resistance, tinted paint viscosity drop, tinted paint rub-up resistance, low temperature coalescence, open time or wet edge maintenance during application, drying time after application, tack resistance during cure or block resistance after cure. In preferred embodiments the disclosed reactive liquid diluent enables a paint or colorant manufacturer to reduce the amounts of other required raw materials (e.g., conventional carriers, dispersing agents, coalescents or humectants) and the number of in-process intermediates, that may otherwise need to be employed in a paint, stain or colorant manufacturing facility.

The disclosed fluid concentrates, colorants and coating compositions may contain a metal drier or other catalyst to catalyze reaction (e.g., chain extension or crosslinking) of reactive unsaturated sites (e.g., (meth)allyl ether groups, vinyl ether groups, (meth)acrylate groups, or conjugated carbon-carbon double bonds) that may be present in the reactive liquid diluent. The disclosed reaction may be accelerated by the presence of oxygen, such as may be available when a coating composition film coalesces, and in such instances could be said to provide oxidative curing of the disclosed reactive liquid diluent. The catalyst may be included in a colorant (if care is taken to control the catalyst amount and if need be meanwhile to exclude air or other substances that might promote premature gelation), may be added to or added along with the colorant as a separate component at the time of point-of-sale tinting, or may be incorporated in a base coating composition. When the base coating composition is an alkyd paint, then the metal driers normally included in such paints can be used, with appropriate adjustment of the metal drier amount if need be, to catalyze IPN formation or crosslinking by the disclosed reactive liquid diluent. Typically, a combination of metal driers will be employed in order to provide desirable surface and subsurface cure characteristics. Exemplary metal driers include metal soaps or coordination compounds made by reacting a metal such as cobalt, calcium, zirconium, manganese, iron or cerium with an appropriate acid. Representative metal driers will be familiar to persons having ordinary skill in the art, and are available from suppliers including Allnex (e.g., ADDITOL™ VXW 4940 which contains cobalt, barium and zirconium, ADDITOL VXW 6206 and ADDITOL VXW 6560 which each contain cobalt, lithium and zirconium, and CYCAT™ VXK 6395 which is a para-toluene sulfonic acid amino blocked acidic catalyst), Dura Chemicals, Inc. (e.g., DRICAT™ 408 which is a cobalt-free drier, DUROCT™ 5% WDX and DUROCT COBALT 12% NX which each contain cobalt, ZIRCONIUM 24% SYN NUXTRA™ which contains zirconium, and XL-DRI™ 69600 which contains cobalt, manganese and vanadium), Huls America, Inc., (e.g., NUXTRA™ Zirconium 24% which contains zirconium), King Industries (e.g., NACURE™ 155 which is a dinonylnaphthalene disulfonic blocked acid catalyst, NACURE 2500 which is a para-toluene sulfonic acid blocked acid catalyst, NACURE 4000 which is a phosphate acid catalyst and NACURE XC-305 which is an acid catalyst), OMG Borchers GmbH (e.g., OMG™ 12% Manganese which contains manganese, and OXY-COAT™ which is an iron drier) and Troy Corporation (e.g., TROYMAX™ Zinc 16 which is a zinc salt metal carboxylate solution). As an alternative or supplement to use of the disclosed metal drier, formation of the disclosed IPN or crosslinking may be initiated or catalyzed using a variety of other free radical cure promoters. Exemplary such promoters include free radical generating catalysts, photoinitiators (e.g., UV or visible light photoinitiators), thermal initiators and other catalysts that will be familiar to persons having ordinary skill in the art. Approaches that do not require the use of a catalyst, such as electron beam cure, may instead or also be employed if desired. When a catalyst is used, the catalyst amount typically will depend upon the chosen catalyst and the amount(s) of reactive liquid diluent components in the disclosed fluid concentrates and colorants, and may be empirically determined. A preferred catalyst amount will provide a hard, clear, tack-free film when the reactive liquid diluent and catalyst are mixed together and drawn down into a thin film using a wire-wound rod or other suitable applicator such as the above-mentioned BIRD bar applicator. Exemplary catalyst amounts, based on a comparison of the total crosslinking molecule and scaffold molecule weight in a fluid colorant or a concentrate to the actual or expected resin solids weight in a coating composition, are about 0.05 to about 0.25 wt. % catalyst, about 0.025 to about 0.125 wt. % catalyst, and about 0.025 to about 0.25 wt. % catalyst.

The disclosed fluid concentrates and colorants may optionally include a further crosslinking agent to assist in IPN formation or crosslinking. For example, if available secondary amine groups are present in a crosslinking molecule or scaffold molecule, then a polyisocyanate (e.g., a diisocyanate) may be added as a separate tinting ingredient or as a component of a base coating composition so as to promote additional crosslinking. Other further crosslinking agents that will be familiar to persons having ordinary skill in the art may be employed for reaction with epoxy groups, acetoacetyl groups, aldehyde groups and other functional groups that may be included in the crosslinking molecule, scaffold molecule or binder. It may however be desirable to avoid the use of functional groups that might compromise the performance of commonly-employed coating compositions or commonly-employed coating composition ingredients, such as phosphate groups, primary amine groups or thiol groups.

The disclosed fluid concentrates and colorants may optionally include additional low viscosity components to modulate (e.g. reduce) viscosity. Exemplary such viscosity modulators include non-reactive or reactive materials of less than 20 cps viscosity. Desirably, such viscosity modulators, if used, are employed in very low amounts, e.g. less than 5 wt. %, less than 3 wt. % or less than 1 wt. % of a colorant or less than 20 wt. % or less than 10 wt. % of a concentrate.

The disclosed fluid concentrates and colorants may optionally include a variety of other adjuvants including extender particles, thickeners and other rheology modifiers to increase viscosity, humectants to discourage dispenser tip drying, defoamers, mildewcides or biocides to discourage microbial growth, and other adjuvants or mixtures thereof that will be familiar to persons having ordinary skill in the art. These other adjuvants may be added along with the pigment, or may be added after the pigment particles have been dispersed. As discussed above, the disclosed reactive liquid diluent may serve as a humectant, and accordingly may enable reduction in or even complete replacement of conventional humectants. For example, reactive liquid diluents containing a scaffold molecule can improve dispenser tip dry resistance in automated or manual colorant dispensing equipment, and thereby enable a reduction in the use of conventional humectants in the colorant or base paint. The resulting tinted paints may also exhibit reduced tinted paint viscosity drop and one or both of reduced tack or improved block resistance.

Extender particles typically will be used in most or all of the disclosed fluid colorants. In some embodiments, they will be used in the disclosed concentrates, and in other embodiments will not be present in such concentrates and instead will be added later when manufacturing fluid colorants or finished coating compositions from such concentrates. Exemplary extender particles include calcium carbonate, calcium sulfate, barium sulfate, mica, clay, calcined clay, feldspar, nepheline, syenite, wollastonite, diatomaceous earth, alumina silicates, non-film forming polymer particles, aluminum oxide, silica, talc, mixtures thereof and other materials that will be familiar to persons having ordinary skill in the art. The chosen extender pigment types and amounts may vary widely and normally will be empirically determined using techniques that will be familiar to persons having ordinary skill in the art.

Exemplary thickeners and other rheology modifiers include sedimentation inhibitors, hydrophobic ethoxylated urethane resin (HEUR) thickeners, hydrophobically-modified, alkali-soluble or alkali-swellable emulsion (HASE) thickeners), cellulosic thickeners, polysaccharide thickeners and mixtures thereof. Exemplary commercially-available rheology modifiers include NATROSOL™ 250 and the AQUAFLOW™ series from Ashland, ATTAGEL™ 50 from BASF Corp., the CELLOSIZE™ series and UCAR POLYPHOBE™ T-900 and T-901 from Dow Chemical Co., BENTONE™ AD and BENTONE EW from Elementis Specialties, LATTICE™ NTC-61 from FMC Biopolymer and ACRYSOL™ RM-6, ACRYSOL RM-8, ACRYSOL RM-12W and ACRYSOL RM-2020NPR all from Rohm & Haas. The chosen rheology modifier types and amounts may vary widely and normally will be empirically determined using techniques that will be familiar to persons having ordinary skill in the art In some embodiments, adjuvants such as defoamers, fungicides, mildewcides or biocides may optionally be included in the disclosed fluid concentrates or colorants, and may instead or in addition be included in a coating composition mixed with or made from such concentrates or colorants. Exemplary defoamers, fungicides, mildewcides and biocides are discussed below in connection with the disclosed coating compositions. In any event, the chosen amounts for these adjuvants may vary widely and normally will be empirically determined using techniques that will be familiar to persons having ordinary skill in the art.

The disclosed concentrates may be mixed (e.g., milled) using a variety of devices that will be familiar to persons having ordinary skill in the art. Exemplary such devices include horizontal bead mills, vertical bead mills, basket mills, roller mills, stator mixers and high speed dispersers.

The disclosed concentrates and colorants preferably are substantially free of, and more preferably do not contain, film-forming polymeric binders. As noted above, the disclosed colorant contains less than a continuous film-forming amount of the film-forming polymeric binder. This amount may be evaluated using a comparison composition made by mixing the binder with the pigment particles, extender particles and other coating composition adjuvants present in the colorant, using the amounts employed in such colorant, but excluding the disclosed reactive liquid diluent from such mixture, and determining whether the pigment level in the mixture is above or below the critical pigment volume concentration (CPVC). For a colorant containing less than a continuous film-forming amount of the film-forming polymeric binder, the pigment amount in the comparison composition will be above CPVC and a drawdown of the comparison composition will form a discontinuous rather than a continuous film.

A variety of materials that will be familiar to persons having ordinary skill in the art may be combined with the above-described fluid concentrates or colorants to make the disclosed coating compositions. The resulting coating compositions may have a variety of surface characteristics (e.g., a flat, satin, semigloss or gloss finish) and may be transparent (viz., containing only a relatively small amount of pigment and having low hiding power), semitransparent or opaque. Opaque compositions may for example have a contrast ratio greater than 96%, greater than 98%, greater than 99% or greater than 99.5%. Properties of the final coating composition may also be adjusted by adding additional quantities of the disclosed reactive liquid diluent to a paint during paint manufacturing, or by using a point-of-sale colorant array in which two or more colorants in the array (e.g., two white colorants) contain similar pigments but different relative amounts of the reactive diluent liquid and pigment.

A variety of film-forming polymeric binders may be used in the disclosed coating compositions. Exemplary binders include latex polymers and solution polymers, e.g., acrylic copolymers, styrene/acrylic copolymers, vinyl acetate copolymers, vinyl acetate/acrylic copolymers, vinyl versatic acid ester/acrylic copolymers, ethylene/vinyl acetate copolymers, styrene/butadiene copolymers, polyesters, alkyd paints, drying oil modified polymers such as polyesters and polyurethanes, polyamides, epoxy esters, polyureas, polyurethane dispersions, polysiloxanes, silicones, fluorinated copolymers such as vinylidene fluoride, binders used in 100% solids UV or visible light curable systems, and blends of any of the above polymeric binders. The binder may include a component or components of a multicomponent (e.g., two component) reactive system such as a component of an isocyanate-polyamine, isocyanate-polyol, isocyanate-amine, epoxy-polyamine, carbodiimide-polyacid, aziridine-polyacid, melamine-polyol, or urea formaldehyde-polyol coating system. The glass transition temperature for the polymeric binder may for example be about −130 to about 350° C., preferably about −20 to about 150° C., and more preferably about 0 to about 100° C. The binder may for example represent about 5 to about 90 volume percent of the dried coating volume. The volume solids, as defined by the fractional volume of dry ingredients in an as-supplied coating composition, may for example represent about 5 to about 80 volume percent of the coating composition. The pigment volume concentration (PVC) may for example represent about 0.1 to about volume percent of the coating. In some embodiments, the PVC desirably is about 0.1 to about 30 volume percent, about 0.5 to about 25 volume percent, or about 1 to about 25 volume percent of the coating. The coating composition viscosity may for example be about 10 to 100,000 cps.

In addition to the polymeric film forming binder and the colorant adjuvants already discussed above, the disclosed finished coating compositions may contain a variety of other adjuvants commonly used in coating compositions. These ingredients preferably are selected so that the coating composition will be a low VOC composition. Preferably the coating composition will contain less than about 10 g/L, more preferably less than about 5 g/L and most preferably less than about 500 ppm, less than about 50 ppm or less than about 10 ppm volatile organic compounds. Representative coating composition adjuvants are described in Koleske et al., Paint and Coatings Industry, April, 2003, pages 12-86, and are available from a wide variety of suppliers including Air Products and Chemicals, Ashland, BASF, Buckman Laboratories, Inc., BYK-Gardner USA, Cognis, Cytec, Dow Chemical Co., Evonik, Rohm and Haas, Rhone Poulenc and Troy Corporation. Exemplary coating composition adjuvants include anti-cratering agents, biocides, coalescents, cosolvents, curing indicators, defoamers, fungicides, heat stabilizers, leveling agents, light stabilizers, mildewcides, optical brighteners, preservatives, surfactants, ultraviolet light absorbers, waxes and the like. The types and amounts of these and other coating composition adjuvants typically will be empirically selected. Representative choices for several such coating composition adjuvants are set out below.

Exemplary biocides or mildewcides include BUSAN™ 1292 from Buckman Laboratories, Inc., NOPCOCIDE™ N-40D from Cognis, KATHON™ LX from Rohm & Haas, and POLYPHASE™ 663, POLYPHASE 678 and POLYPHASE PW-40 from Troy Corporation.

Coalescents may assist in coalescing a film-forming polymer (for example an emulsion polymer) into a continuous film. As discussed above, the disclosed reactive liquid diluent may serve as a coalescent, and accordingly may enable reduction in, or even complete replacement of, conventional coalescents. After coating cure, formation by the reactive liquid diluent of the disclosed IPN within, or crosslinks with, the cured binder film may provide reduced post-cure VOC levels compared to the use of conventional coalescents. Exemplary conventional coalescents include benzoates such as alkyl benzoates, monobenzoates and dibenzoates; hexanoates such as OPTIFILM™ 400 tri(ethylene glycol) bis(2-ethylhexanoate) from Eastman Chemical Co.; dioctyl maleate; oleic acid propylene glycol esters such as EDENOL™ EFC-100 from Cognis having the formula $HOCH(CH_3)CH_2OC(O)(CH_2)_7CH=CH(CH_2)_7CH_3)$;

UCAR Filmer IBT, UCAR n-propyl propionate, UCAR n-butyl propionate and UCAR n-pentyl propionate from DOW Chemical Co.; ester alcohols such as TEXANOL™ ester alcohol from Eastman Chemical Co. (viz., 2,2,4-trimethyl-1,3-pentanediol monoisobutyrate, CAS NO. 24265-77-4); materials discussed in U.S. Pat. Nos. 6,762,230 B2, 7,812,079 B2 and 8,110,624 B2 (collectively, Brandenburger et al.) and in U.S. Pat. No. 8,106,239 B2 (Zhou et al.) and U.S. Pat. No. 8,394,496 B2 (Foster et al.), in U.S. Published Patent Application No. US 2009/0149591 A1 (Yang et al.); mixtures thereof and the like. Low VOC or no-VOC coalescents are preferred, and dioctyl maleate is especially preferred. When a conventional coalescent is employed, the coating compositions preferably contain about 0.05 to about 10 or about 0.05 to about 5 wt. % conventional coalescent based on the final coating composition weight. If desired, the reactive liquid diluent or conventional coalescent(s) may be included in the colorant but not in the base coating composition of a point-of-sale tinting system. In an additional embodiment, a separate dispensing canister in a multi-canister point-of-sale colorant dispenser could be dedicated to an untinted composition containing the reactive liquid diluent by itself or with a conventional coalescent. Additions from this dedicated canister could be used to adjust the amount of coalescent in the final tinted coating composition, thus permitting adjustment of coalescent content across a range of base coating composition formulations.

Cosolvents may assist in mixing or coating a composition; may speed up, retard or otherwise change the time or emissions associated with drying; may improve wet edge properties or overlap characteristics; may improve freeze-thaw protection, or may provide or improve other features, and generally will not be retained in a film of the dried, cured or otherwise hardened coating composition. A chosen cosolvent preferably is a non-HAPS, low VOC material and not an ozone depleter. Cosolvents that are exempted from categorization as VOCs by the EPA (viz., so-called "exempt solvents" such as parachlorobenzotrifluoride, acetone, methyl acetate, tertiary butyl acetate and volatile methyl siloxanes) are also preferred. Other exemplary cosolvents include glycols (e.g., ethylene glycol and diethylene glycol), glycol ethers (e.g., DOWANOL™ DPM and Butyl CEL-LOSOLVE™ from Dow Chemical Co.), alcohols (e.g., n-propanol, isopropanol, n-butanol, isobutanol, 2-methyl butanol, isoamyl alcohol and other primary amyl alcohol isomers, n-pentanol, 2-ethylhexanol, 4-hydroxy-2,6,8-trimethylnonane and diisobutyl carbinol), esters and ester alcohols (e.g., isopropyl acetate; n-butyl acetate; isobutyl acetate; n-propyl acetate; primary amyl acetate mixed isomers, and UCAR™ Ester EEP from Dow Chemical Co.), ketones (e.g., diisobutyl ketone and ECOSOFT™ Solvent IK from Dow Chemical Co.), CARBOWAX™ 300 and CARBOWAX 600 polyethylene from Dow Chemical Co., mixtures thereof and the like. When a cosolvent is present, the coating compositions preferably contain about 0.1 to about 10 or about 2 to about 5 wt. % cosolvent based on the final coating composition weight.

Exemplary light stabilizers include hindered amines such as TINUVIN™ 123-DW and TINUVIN 292 HP from Ciba Specialty Chemicals. Exemplary ultraviolet light absorbers include TINUVIN 234 and TINUVIN 1130 from Ciba Specialty Chemicals. Exemplary waxes include AQUACER™ 593 from Altana, HYDROCER™ 303 from Shamrock Technologies, Inc. and MICHEM™ Emulsion 32535 from Michelman, Inc.

Exemplary surfactants include anionic, amphoteric and nonionic materials. Commercially-available surfactants include the TAMOL™ series from Dow Chemical Co., nonyl and octyl phenol ethoxylates from Dow Chemical Co. (e.g., TRITON™ X-45, TRITON X-100, TRITON X-114, TRITON X-165, TRITON X-305 and TRITON X-405) and other suppliers (e.g., the T-DET N series from Harcros Chemicals), alkyl phenol ethoxylate (APE) replacements from Dow Chemical Co., Elementis Specialties, Inc. and others, various members of the SURFYNOL™ series from Air Products and Chemicals, Inc. (e.g., SURFYNOL 104, SURFYNOL 104A, SURFYNOL 104BC, SURFYNOL 104DPM, SURFYNOL 104E, SURFYNOL 104H, SURFYNOL 104PA, SURFYNOL 104PG50, SURFYNOL 104S, SURFYNOL 2502, SURFYNOL 420, SURFYNOL 440, SURFYNOL 465, SURFYNOL 485. SURFYNOL 485W, SURFYNOL 82, SURFYNOL CT-211, SURFYNOL CT-221, SURFYNOL OP-340, SURFYNOL PSA204, SURFYNOL PSA216, SURFYNOL PSA336, SURFYNOL SE and SURFYNOL SE-F), various fluorocarbon surfactants from 3M, E. I. DuPont de Nemours and Co. and other suppliers, and phosphate esters from Ashland, Rhodia and other suppliers. When a surfactant is present, the coating compositions preferably contain about 0.1 to about 10 wt. % and more preferably about 1 to about 3 wt. % surfactant based on the total composition weight.

The disclosed fluid colorants and coating compositions may be packaged in any convenient packaging suitable for storing a desired quantity of the colorant or coating composition without premature gelation, undue separation or other undesirable degradation during storage. Exemplary packaging containers for colorants include bottles, cans, cartridges, jars and pouches sized to fit available manual or automated colorant dispensers. Exemplary packaging containers for coating compositions include cans, pails, bottles, drums, totes and tanks. The disclosed coating compositions may be factory-applied to substrates such as building components at a manufacturing site; may be supplied to professional or consumer point-of-sale outlets and used as is or custom-tinted with the disclosed fluid colorants; or may be supplied to end users and applied onsite to finished articles, e.g., as paints or pigmented stains for use on interior or exterior building components (for example, interior or exterior walls, trim, siding, floors, ceilings, roofing and cabinetry), furniture and other paintable or stainable objects and surfaces.

The disclosed coating compositions may be applied to a variety of substrates including metals (including aluminum, brass, copper, iron, pot metal, steel, tin and zinc), woods (including engineered woods, impregnated woods and wood-derived materials), plastics (including thermoplastics and thermosets), composites, cements, cement fiberboard, stone, glass, and other materials that will be familiar to persons having ordinary skill in the art. The disclosed coating compositions have particular value as highly-pigmented topcoats. They may also be used as pigmented or unpigmented primers. In preferred embodiments, the properties (for example, storage stability including stable viscosity, freedom from settling or separation, wet edge maintenance, drying time, blocking resistance, water sensitivity, opacity, contrast ratio, hiding power, color stability or minimal color change) of tinted coating compositions containing the disclosed reactive liquid diluent will be as good as or better than the properties of corresponding untinted or tinted coating compositions that do not contain the reactive liquid diluent.

The disclosed coating compositions may be applied using a variety of methods that will be familiar to persons having ordinary skill in the art, including spraying (e.g., air-assisted, airless or electrostatic spraying), brushing, roller coating, flood coating, curtain coating, coil coating, dipping and electrostatic coating. The compositions may be applied at a variety of wet film thicknesses. Preferably the wet film thickness is such as to provide a dry film thickness of about 13 to about 260 µm (about 0.5 to about 10 mil) and more preferably about 25 to about 75 µm (about 1 to about 3 mil) for the dried coating. The applied coating may be cured by allowing it to air dry or by accelerating curing using a variety of drying devices (e.g., ovens) that will be familiar to persons having ordinary skill in the art. Exemplary interior temperatures for such drying devices are about 30° to about 65° C., and exemplary heating times are less than 60 minutes, less than 45 minutes, less than 30 minutes, less than 15 minutes, less than 10 minutes, less than 6 minutes or less than 5 minutes. Heating times will tend to decrease with increased temperature, increased airflow, decreased humidity or decreased coating thickness.

The invention is further illustrated in the following non-limiting examples, in which all parts and percentages are by weight unless otherwise indicated.

Example 1

Crosslinking Molecule A

Into a 4 necked, 3 liter round bottom flask was charged 449.4 grams (2.1 moles) of trimethylolpropane diallyl ether 90 from Perstorp, 100 grams (1 mole) of succinic anhydride and 0.5 grams of butyl stannoic acid. The contents were heated up to 190° C. under a nitrogen sparge and esterified to an acid value less than 5 to form a tetraallyl ether-functional crosslinking molecule. The reactor contents were then vacuum stripped to remove volatile components. The crosslinking molecule had the following characteristics: % Non volatiles=95.4; Viscosity=60 cps; Color=2 Gardner. The crosslinking molecule was designated as Crosslinking Molecule A.

Crosslinking Molecule B

Using the method employed for Crosslinking Molecule A, the flask was charged with 449.4 grams (2.1 moles) of trimethylolpropane diallyl ether, 166 grams (1 mole) of isophthalic acid and 0.6 grams of butyl stannoic acid. The contents were heated up to 210° C. under a nitrogen sparge and esterified to an acid value less than 5 to form a tetraallyl ether-functional crosslinking molecule. The reactor contents were then vacuum stripped to remove volatile components. The crosslinking molecule had the following characteristics: % Non volatiles=96.6; Viscosity=400 cps; Color=2 Gardner. The crosslinking molecule was designated as Crosslinking Molecule B.

Example 2

Scaffold Molecule A

Into a 4 necked, 3 liter round bottom flask was charged 600 grams (1 mole) of CARBOWAX polyethylene glycol PEG600 (Dow Chemical Co.), 560 grams (2 moles) of PAMOLYN™ 200 linoleic acid (Eastman Chemical Co.) and 1.1 grams of butyl stannoic acid. The contents were heated up to 220° C. under a nitrogen sparge and esterified to an acid value less than 5 to form a linear scaffold molecule with the following characteristics: % Non volatiles=99.3; Viscosity=110 cps; Color=8 Gardner. The scaffold molecule was designated as Scaffold Molecule A.

Scaffold Molecule B

Using the method employed for Scaffold Molecule A, the flask was charged with 990 grams (about 1 mole) of Polyol 3165 (a 1,014 molecular weight ethoxylated trimethylolpropane triol available from Perstorp), 560 grams (2 moles) of PAMOLYN 200 linoleic acid and 1.5 grams of butyl stannoic acid. The contents were heated up to 220° C. under a nitrogen sparge and esterified to an acid value less than 5 to form a linear scaffold molecule with the following characteristics: % Non volatiles=99.6; Viscosity=150 cps; Color=10 Gardner. The scaffold molecule was designated as Scaffold Molecule B.

Scaffold Molecule C

Into a 4 necked, 3 liter round bottom flask was charged 220.2 grams (2.2 moles) succinic anhydride and 700 grams (2 moles) CARBOWAX MPEG 350 (Dow Chemical Company). The contents were heated to 150° C. under a nitrogen sparge and esterified to a target acid value of 146, giving a monoester intermediate with the following characteristics: Acid value=145, % Non volatiles=98.7; Viscosity=182 cps; Color=1 Gardner.

The flask may be cooled to room temperature and 622.05 grams trimethylolpropane diallyl ether 90 (Perstorp), 1.5 grams butyl stannoic acid and methyl isobutyl ketone (MIBK) added to the flask. The contents may be heated to 190° C. under a nitrogen sparge and esterified to an acid value less than 5 at which point MIBK and excess trimethylolpropane diallyl ether 90 may be removed via nitrogen followed by vacuum stripping. The resulting scaffold molecule would be designated as Scaffold Molecule C.

Scaffold Molecule D

Using the method employed for Scaffold Molecule C, the flask was charged with 140.9 grams succinic anhydride and 960 grams CARBOWAX MPEG 750 (Dow Chemical Company). The contents were heated to 150° C. under a nitrogen sparge and esterified to a target acid value of 78, giving a monoester intermediate with the following characteristics: Acid value=77, % Non volatiles=93.7; Viscosity=150 cps; Color=1 Gardner.

The flask can be cooled to room temperature and 393.7 grams trimethylolpropane diallyl ether 90, 1.5 grams butyl stannoic acid and MIBK added to the flask. The contents may be heated to 190° C. under a nitrogen sparge and esterified to an acid value less than 5 at which point MIBK and excess trimethylolpropane diallyl ether 90 may be removed via nitrogen followed by vacuum stripping. The resulting scaffold molecule would be designated as Scaffold Molecule D.

Scaffold Molecule E

Using the method employed for Scaffold Molecule C, the flask was charged with 496 grams (about 5 moles) succinic anhydride and 2,000 grams (2 moles) CARBOWAX PEG 1000 (Dow Chemical Company). The contents were heated to 150° C. under a nitrogen sparge and esterified to a target acid value of 102, giving a diester intermediate with the following characteristics: Acid value=90, % Non volatiles=99.2; Viscosity=806 cps (BROOKFIELD RVF viscometer, No. 2 spindle at 20 rpm and 35° C.); Color=1 Gardner. This material was a solid at room temperature.

The flask may be cooled to near, but above, room temperature before adding 406.2 grams trimethylolpropane diallyl ether 90, 1.4 grams butyl stannoic acid and MIBK added to the flask. The contents may be heated to 190° C. under a nitrogen sparge and esterified to an acid value less than 5 at which point MIBK and excess trimethylolpropane diallyl ether 90 may be removed via nitrogen followed by vacuum stripping. The resulting scaffold molecule would be designated as Scaffold Molecule E.

Scaffold Molecule F

The method employed for Scaffold Molecule A was repeated using CARBOWAX polyethylene glycol PEG 1000 (Dow Chemical Co.) in place of PEG 600 glycol. Although the PEG 1000 glycol was also used to make Scaffold Molecule E, and had approximately the same molecular weight as the triol used to make Scaffold Molecule B, a non-liquid product with a consistency and viscosity like that of cold cream was obtained. Use of this product as a reactive diluent would require heating it during colorant, concentrate or coating composition formation, or combining it with one or both of a very low viscosity crosslinking molecule or a very low viscosity further scaffold molecule.

Scaffold Molecule G

Into a 4 necked, 3 liter round bottom flask was charged 480 grams (2.5 moles) citric acid, 1070 grams (5 moles) of trimethylolpropane diallyl ether 90 (Perstorp), 2.3 grams butyl stannoic acid and MIBK. The contents were heated to 150° C. under a nitrogen sparge and esterified to a target acid value of 90. Next, 875 grams CARBOWAX MPEG (Dow Chemical Company) were added and the flask was heated to 170° C. for two hours followed by heating to 190° C. until the acid value was <5, at which point MIBK was removed via nitrogen followed by vacuum stripping, giving an ethoxylated allyl diester with the following characteristics: Acid Value=1.6; % Non volatiles=96.1; Viscosity=275 cps; Color=14 Gardner. The ethoxylated allyl diester was designated as Scaffold Molecule G.

Scaffold Molecule H

Into a 4 necked, 3 liter round bottom flask was charged 1215.3 grams (6.3 moles) of citric acid, 2709.1 grams (12.7 moles) of trimethylolpropane diallyl ether 90, 3.7 grams butyl stannoic acid and 200 grams MIBK. The contents were heated to 150° C. under a nitrogen sparge and esterified to a target acid value of 96 at which point MIBK was removed via nitrogen stripping, giving a diester intermediate with the following characteristics: Acid Value=83; % Non volatiles=98.9; Viscosity=3,150 cps; Color=1 Gardner.

The viscosity of the diester intermediate was greater than 1,000 cps, but based on the viscosity of structurally similar Scaffold Molecule G, ethoxylation should lower the viscosity of the diester intermediate. A stainless steel high-pressure reactor may be charged with the intermediate and 0.1-1% basic aqueous sodium hydroxide catalyst and heated while stirring to 130-150° C. under slight nitrogen pressure. Ethylene oxide may be fed to the reactor and allowed to polymerize sufficiently to incorporate a desired number of moles of ethylene oxide into the intermediate. Acid may be added to terminate polymerization and the product may be isolated via nitrogen or vacuum stripping. The resulting scaffold molecule would be designated as Scaffold Molecule H.

Scaffold Molecule I

Into a 4 necked, 3 liter round bottom flask was charged 1152.0 grams (6 moles) of trimellitic anhydride, 2568.0 grams (12 moles) of trimethylolpropane diallyl ether 90, 3.6 grams butyl stannoic acid and MIBK. The contents were heated to 190° C. under a nitrogen sparge and esterified to a target acid value of 93 at which point MIBK was removed via nitrogen stripping, giving a diester intermediate with the following characteristics: Acid Value=74; % Non volatiles=99.4; Viscosity=8,760 cps; Color=3 Gardner.

The viscosity of the diester intermediate was greater than 1,000 cps, but for the reasons discussed above in connection with Scaffold Molecule H, ethoxylation should lower the viscosity of the diester intermediate. A stainless steel high-pressure reactor may be charged with the intermediate and 0.1-1% basic catalyst solution (e.g., aqueous sodium hydroxide) and heated while stirring to 130-150° C. under slight nitrogen pressure. Ethylene oxide may be fed to the reactor and allowed to polymerize sufficiently to incorporate a desired number of moles of ethylene oxide into the intermediate and to reduce the viscosity of the resulting scaffold molecule. Acid may be added to terminate polymerization and the product may be isolated via nitrogen or vacuum stripping. The scaffold molecule would be designated as Scaffold Molecule I.

Scaffold Molecule J

Into a 4 necked, 3 liter round bottom flask was charged 1176.0 grams (12 moles) of maleic anhydride and 2568.0 grams (12 moles) of trimethylolpropane diallyl ether 90. The contents were heated to 110° C. under a nitrogen sparge and esterified to a target acid value of 180, giving a monoester intermediate with the following characteristics: Acid Value=182; % Non volatiles=88.5; Viscosity=230 cps; Color<1 Gardner.

A stainless steel high-pressure reactor may be charged with the resulting monoester intermediate and 0.1-1% basic catalyst solution (e.g., aqueous sodium hydroxide) and heated while stirring to 130-150° C. under slight nitrogen pressure. Ethylene oxide may be fed to the reactor and allowed to polymerize sufficiently to incorporate a desired number of moles of ethylene oxide in the resulting scaffold molecule. Acid may be added to terminate polymerization and the product may be isolated via nitrogen or vacuum stripping. The scaffold molecule would be designated as Scaffold Molecule J.

Scaffold Molecule K

Into a 4 necked, 3 liter round bottom flask was charged 1078.0 grams (11 moles) of maleic anhydride and 2574.0 grams (11 moles) of pentaerythritol triallyl ether (Perstorp). The contents were heated to 110° C. under a nitrogen sparge and esterified to a target acid value of 169, giving a monoester intermediate with the following characteristics: Acid Value=159; % Non volatiles=84.4; Viscosity=170 cps; Color<1 Gardner.

A stainless steel high-pressure reactor may be charged with the resulting monoester intermediate and 0.1-1% basic catalyst solution (e.g., aqueous sodium hydroxide) and heated while stirring to 130-150° C. under slight nitrogen pressure. Ethylene oxide may be fed to the reactor and allowed to polymerize sufficiently to incorporate a desired number of moles of ethylene oxide into the resulting scaffold molecule. Acid may be added to terminate polymerization and the product may be isolated via nitrogen or vacuum stripping. The scaffold molecule would be designated as Scaffold Molecule K.

Scaffold Molecule L

The method employed for Scaffold Molecule B was repeated using 1 mole rather than 2 moles linoleic acid. The resulting ethoxylated monoallyl ether had a viscosity of 193 cps and was designated as Scaffold Molecule L.

Scaffold Molecule M

The method employed for Scaffold Molecule G was repeated using 1 mole CARBOWAX MPEG 500 (Dow Chemical Company) in place of the CARBOWAX MPEG 350. The resulting ethoxylated tetraallyl ether had a viscosity of 235 cps and was designated as Scaffold Molecule H.

Scaffold Molecule N

Into a 4 necked, 3 liter round bottom flask was charged 1 mole allyl pentaerythritol (Perstorp), 1 mole toluene diisocyanate and 1 mole CARBOWAX MPEG (Dow Chemical Company), which following reaction to consume the isocyanate groups produced an ethoxylated triallyl ether containing urethane linkages and having a viscosity of 2,100 cps. The ethoxylated triallyl ether was designated as Scaffold Molecule N.

Scaffold Molecule 0

The method employed for Scaffold Molecule N was repeated using 1 mole isophorone diisocyanate in place of the toluene diisocyanate, which following reaction to consume the isocyanate groups produced an ethoxylated triallyl ether containing urethane linkages and having a viscosity of 1,425 cps. The ethoxylated triallyl ether was designated as Scaffold Molecule 0.

Scaffold Molecule P

The method employed for Scaffold Molecule N was repeated using 1 mole trimethylolpropane diallyl ether in place of the allyl pentaerythritol, which following reaction to consume the isocyanate groups produced an ethoxylated diallyl ether containing urethane linkages and having a viscosity of 2,900 cps. The ethoxylated diallyl ether was designated as Scaffold Molecule P.

Scaffold Molecule Q

The method employed for Scaffold Molecule 0 was repeated using 1 mole trimethylolpropane diallyl ether in place of the allyl pentaerythritol, which following reaction to consume the isocyanate groups produced an ethoxylated diallyl ether containing urethane linkages and having a viscosity of 1,400 cps. The ethoxylated diallyl ether was designated as Scaffold Molecule Q.

Example 3

Concentrates

White pigment dispersion concentrates were prepared by mixing together varying amounts of Crosslinking Molecule A, Scaffold Molecule B and rutile titanium dioxide particles (TIOXIDE™ TR 93 from Huntsman). No other pigment wetting or dispersing agents or carriers were added. The amounts of each ingredient in the white concentrates are set out below in Table 1A.

Black pigment dispersion concentrates were prepared by mixing Scaffold Molecule A, dioctyl maleate coalescent, various dispersants and carbon black particles (RAVEN™ 14 from Birla Carbon), and milling 150 parts of the combined ingredients with 230 parts zirconia milling media until the pigment particles reached a 7.5 Hegman Grind value. The amounts of each ingredient in the black concentrates are set out below in Table 1B.

TABLE 1A

White Concentrates

| Ingredient | Run No. 3-1 | Run No. 3-2 |
|---|---|---|
| Crosslinking Molecule A | 22.5 | 20 |
| Scaffold Molecule B | 22.5 | 20 |
| TiO$_2$ particles | 55.0 | 60 |
| Total | 100.0 | 100.0 |

TABLE 1B

Black Concentrates

| Ingredient | Run No. 3-3 | Run No. 3-4 | Run No. 3-5 |
|---|---|---|---|
| Scaffold Molecule A | 40 | 40 | 40 |
| Dioctyl Maleate | 10 | 10 | 10 |
| SOLSPERSE M387 (Lubrizol) | 20 | | |
| DISPERBYK 2013 (Byk-Chemie) | | 20 | |
| DISPERBYK-145 (Byk-Chemie) | | | 20 |
| RAVEN 14 carbon black | 30 | 30 | 30 |
| Total | 100 | 100 | 100 |

Each concentrate formed a stable dispersion and useful factory intermediate that could be "let down" by the addition of additional ingredients to provide colorants or coating compositions. The white concentrates of Run Nos. 3-1 and 3-2 were each let down by the respective addition of 10 wt. % or 20 wt. % Crosslinking Molecule A and shaken for 3 minutes on a HARBIL™ paint shaker to provide two similar dispersions containing 50 wt. % pigment solids and 100 wt. % nonvolatile materials. The letdown compositions were slightly thixotropic liquids with a viscosity of 74 cps. Their nonvolatilizing nature was verified by heating the letdown compositions in a pie plate for hour at 110° C. whereupon less than 0.35% measured weight loss was observed. When evaluated according to ASTM D6886 using methyl palmitate as the boiling point marker, the letdown compositions exhibited less than 30 g/L VOCs. The letdown compositions also had good storage stability, as verified by storing them for 4 days at 140° C. with no observed separation or settling, and with full preservation of good flow properties. The letdown compositions were combined with a metal drier package containing 4.5 wt. % BORCHI Oxy-Coat 1310 metal catalyst (0.09 wt. % iron) from OMG Borchers GmbH and 1.875 wt. % NUXTRA Zirconium 24% from Huls America, Inc., drawn down on aluminum substrates as 0.08 mm (3 mil) thick opaque white films, left to dry at room temperature and evaluated for cure using a five point scale in which a value of 1 represents a wet coating, 2 represents a very tacky coating, 3 represents a slightly tacky coating, 4 represents a coating that is tack-free but may be indented with a fingernail, and 5 represents a coating that is tack-free and not indentable with a fingernail. The wet drawdown films became dry but slightly tacky at 4 days and tack free but indentable using a fingernail at 5 days. The letdown compositions accordingly provided stable one-component air-dry coating compositions.

The black concentrates of Run Nos. 3-3 through 3-5 had respective viscosities (as measured using a BROOKFIELD KU+ viscometer) of 140+, 140+ and 129 Krebs Units (kU). They may be used to form letdown compositions and stable one-component air-dry coating compositions like those made from the white concentrates of Run Nos. 3-1 and 3-2.

Example 4

Clearcoats

Crosslinking Molecule A was used as is or combined with 25 wt. % or 50 wt. % LARAPOL™ A 18 aldehyde resin using a high speed mixer to provide three formulations shown below in Table 2:

TABLE 2

| Ingredient | Run No. 4-1 | Run No. 4-2 | Run No. 4-3 |
|---|---|---|---|
| Crosslinking Molecule A | 200 | 200 | 200 |
| LARAPOL A 18 resin | — | 67 | 200 |
| Mixing Conditions | — | 4 hours at 62° C. | 4 hours at 52° C. |

The three formulations were combined with a metal drier package containing 0.015% cobalt (0.125 wt. % DUROCT Cobalt 12% NX from Dura Chemicals, Inc.), 0.015% manganese (0.125 wt. % OMG 12% Manganese from OMG Borchers GmbH) and 0.15% zirconium (0.625 wt. % NUXTRA Zirconium 24%), then drawn down as 0.08 mm (3 mil) thick films on aluminum substrates, left to dry at room temperature and evaluated to determine how many days were required to form a tack free film that did or did not exhibit indentation when pressed with a fingernail. The hardened films were clear and colorless. The results are set out below in Table 3:

TABLE 3

Drawdown Results

| Run No. | Composition | Days Until Tack-Free with Finger Nail Indentation | Days Until Tack-Free with No Indentation |
|---|---|---|---|
| 4-1 | Neat Reactive Diluent | 13 | 16 |
| 4-2 | 25 wt. % Resin | 6 | 13 |
| 4-3 | 50 wt. % Resin | 6 | Not observed in 24 days |

The results in Table 3 show that the reactive liquid diluent combined with a metal drier package and an optional film-forming polymeric binder could provide tack free films with good final properties.

Example 5

Reactive Diluents

Crosslinking Molecules A and B and Scaffold Molecules A and B were mixed at two different ratios to form eight different liquid reactive diluents. The viscosities for each mixture were measured an Anton Paar MCR 302 Modular Compact Rheometer with a CP50-1, 50 mm diameter 1° measuring cone at a temperature of 25° C. and a shear rate of 100/sec, and evaluated 30 seconds after the start of measurement to avoid initial oscillations in the measured viscosity values. The mixtures all had viscosities below 1,000 cps, and exhibited Newtonian behavior when evaluated at increasing shear rates. The reactive diluents were combined with the metal drier package used in Example 4. The resulting mixtures were drawn down as 0.08 mm (3 mil) thick films, left to dry at room temperature and evaluated to determine how many days were required to form a tack free film that did not exhibit indentation when pressed with a fingernail. The hardened films were clear and colorless. When the metal drier package was excluded, tack free films were not obtained even after three weeks standing time. The results are set out below in Table 4:

TABLE 4

Drawdown Results

| Run No. | Crosslinking Molecule | Scaffold Molecule | Ratio, Crosslinking Molecule:Scaffold Molecule | Viscosity, cps | Days until Tack-Free |
|---|---|---|---|---|---|
| 5-1 | A | A | 66:33 | 101 | 21 |
| 5-2 | A | A | 85:15 | 103 | 4 |
| 5-3 | B | A | 66:33 | 208 | 21 |
| 5-4 | B | A | 85:15 | 294 | 4 |
| 5-5 | A | B | 66:33 | 132 | 21 |
| 5-6 | A | B | 85:15 | 117 | 4 |
| 5-7 | B | B | 66:33 | 280 | 21 |
| 5-8 | B | B | 85:15 | 346 | 4 |

The results in Table 4 show formation of tack-free films from low viscosity crosslinking molecule:scaffold molecule mixtures. The crosslinking molecule and scaffold molecule are not required to form tack-free films, but formation of tack-free films provides good evidence that the reactive liquid diluent will not plasticize a final cured coating composition.

Example 6

Latex Viscosity Stability

The reactive liquid diluents of Example 5 were added at various levels to a tintable latex base paint (VALSPAR™ SIGNATURE™ Semi-Gloss Interior Base C No. 98824) containing the metal drier package of Example 5, and evaluated to determine initial viscosity and viscosity after standing in a sealed paint container for one day. The untinted base paint was also evaluated with and without the metal drier. For further comparison purposes, a conventional humectant/dispersant combination (CARBOWAX polyethylene glycol PEG400 from Dow Chemical Co. and NOVEL™ 23E7 ethoxylate from Sasol North America) was also added to the latex base paint. The results are shown below in Table 5:

TABLE 5

Viscosity Stability

| Additives | Wt. % Additive Added Into Latex Base | Initial Viscosity, cps | Initial Viscosity Change vs. untinted, cps | Viscosity After 1 Day, cps | Viscosity After 1 Day Change vs. untinted, cps |
|---|---|---|---|---|---|
| Base w/no metal driers | — | 133.8 | — | 128.2 | — |
| Base w/ metal driers | As in Example 5 | 129.6 | -4.2 | 129.2 | 1.0 |
| PEG400/ NOVEL 23E7 Ethoxylate | 2.5% each | 64.8 | -69.0 | 63.4 | -64.8 |
| Run No. 5-1 in base w/metal driers | 2% | 133.8 | 0.1 | 131.9 | 3.7 |
|  | 5% | 146.9 | 13.2 | 144.8 | 16.7 |
|  | 10% | 217.1 | 83.4 | 197.3 | 69.2 |
| Run No. 5-2 in base w/metal driers | 2% | 136.7 | 2.9 | 142.1 | 14.0 |
|  | 5% | 149.6 | 15.8 | 152.5 | 24.4 |
|  | 10% | 207.3 | 73.6 | 200.3 | 72.1 |
| Run No. 5-3 in base w/metal driers | 2% | 133.8 | 0.0 | 140.0 | 11.9 |
|  | 5% | 143.4 | 9.6 | 148.1 | 20.0 |
|  | 10% | 178.0 | 44.2 | 186.1 | 57.9 |
| Run No. 5-4 in base w/metal driers | 2% | 133.2 | -0.6 | 138.4 | 10.2 |
|  | 5% | 142.3 | 8.6 | 148.4 | 20.2 |
|  | 10% | 156.7 | 22.9 | 166.9 | 38.8 |
| Run No. 5-5 in base w/metal driers | 2% | 122.3 | -11.5 | 126.7 | -1.5 |
|  | 5% | 115.6 | -18.2 | 116.9 | -11.3 |
|  | 10% | 133.1 | -0.6 | 111.1 | -17.1 |
| Run No. 5-6 in base w/metal driers | 2% | 131.1 | -2.7 | 132.6 | 4.4 |
|  | 5% | 136.1 | 2.3 | 137.3 | 9.2 |
|  | 10% | 184.4 | 50.7 | 164.8 | 36.7 |
| Run No. 5-7 in base w/metal driers | 2% | 121.5 | -12.3 | 121.5 | -6.7 |
|  | 5% | 112.3 | -21.5 | 114.6 | -13.6 |
|  | 10% | 107.1 | -26.7 | 108.8 | -19.4 |
| Run No. 5-8 in base w/metal driers | 2% | 131.9 | -1.9 | 131.3 | 3.2 |
|  | 5% | 131.1 | -2.7 | 138.2 | 10.0 |
|  | 10% | 136.5 | 2.8 | 142.7 | 14.6 |

The results in Table 5 show that less viscosity change was exhibited when using the reactive liquid diluent than when using the conventional humectant/dispersant combination.

Example 7

Alkyd Viscosity Stability

Using the method of Example 6, the reactive liquid diluents of Example 5 were added at various levels to a tintable alkyd base paint (VALSPAR ANTI-RUST ARMOR™ Gloss Interior/Exterior Clear Base No. 21829) and evaluated to determine initial viscosity and viscosity after standing. A metal drier package was already present in the base paint and thus additional metal driers were not added. The results are shown below in Table 6:

TABLE 6

Alkyd Viscosity Stability

| Additives | Wt. % Additive Added Into Alkyd Base | Initial Viscosity, cps | Initial Viscosity Change vs. untinted, cps | Viscosity After 1 Day, cps | Viscosity After 1 Day Change vs. untinted, cps |
|---|---|---|---|---|---|
| None | — | 336.7 | — | 342.75 | — |
| PEG400/ NOVEL 23E7 Ethoxylate | 2.5% each | 370.3 | 33.6 | 375.85 | 33.1 |
| Run No. 5-1 | 2% | 306.9 | -29.8 | 311.7 | -31.05 |
|  | 5% | 270.9 | -65.8 | 272.75 | -70 |
|  | 10% | 223.6 | -113.2 | 223.35 | -119.4 |

TABLE 6-continued

Alkyd Viscosity Stability

| Additives | Wt. % Additive Added Into Alkyd Base | Initial Viscosity, cps | Initial Viscosity Change vs. untinted, cps | Viscosity After 1 Day, cps | Viscosity After 1 Day Change vs. untinted, cps |
|---|---|---|---|---|---|
| Run No. 5-2 | 2% | 291.3 | −45.5 | 302.5 | −40.25 |
|  | 5% | 250.7 | −86.1 | 257.55 | −85.2 |
|  | 10% | 201.1 | −135.7 | 210.65 | −132.1 |
| Run No. 5-3 | 2% | 306.5 | −30.2 | 320.05 | −22.7 |
|  | 5% | 277.4 | −59.4 | 280.85 | −61.9 |
|  | 10% | 234.2 | −102.5 | 241.25 | −101.5 |
| Run No. 5-4 | 2% | 294.8 | −41.9 | 313.15 | −29.6 |
|  | 5% | 259.4 | −77.3 | 269.4 | −73.35 |
|  | 10% | 220.3 | −116.5 | 225.05 | −117.7 |
| Run No. 5-5 | 2% | 313.4 | −23.3 | 320.05 | −22.7 |
|  | 5% | 280.9 | −55.9 | 289.8 | −52.95 |
|  | 10% | 241.7 | −95.1 | 248.55 | −94.2 |
| Run No. 5-6 | 2% | 295.0 | −41.7 | 306.5 | −36.25 |
|  | 5% | 259.4 | −77.3 | 272.1 | −70.65 |
|  | 10% | 217.8 | −119.0 | 219.6 | −123.15 |
| Run No. 5-7 | 2% | 321.1 | −15.7 | 327.95 | −14.8 |
|  | 5% | 291.5 | −45.3 | 302.95 | −39.8 |
|  | 10% | 259.9 | −76.9 | 263.95 | −78.8 |
| Run No. 5-8 | 2% | 300.7 | −36.1 | 309.15 | −33.6 |
|  | 5% | 280.1 | −56.7 | 277.1 | −65.65 |
|  | 10% | 228.6 | −108.2 | 237.9 | −104.85 |

The results in Table 6 show that somewhat greater viscosity change was exhibited in the alkyd base paint when using 5 wt. % of the reactive liquid diluent than when using 5 wt. % of the conventional humectant/dispersant combination. Use of lower amounts of the reactive liquid diluent tended to provide reduced viscosity change, and use of greater amounts of the reactive liquid diluent tended to provide increased viscosity change.

Example 8

Latex Blocking Test

In a series of runs, the reactive liquid diluents and metal drier package of Example 5 were added to the Example 6 latex base paint and evaluated for blocking resistance according to ASTM D-4946-89, using the 1-10 scale shown below in Table 7:

TABLE 7

Blocking Resistance Ratings

| Rating | Observed Tack or Adhesion Upon Separation |
|---|---|
| 10 | No Tack |
| 9 | Trace Tack |
| 8 | Very Slight Tack |
| 7 | Very Slight to Slight Tack |
| 6 | Slight Tack |
| 5 | Moderate Tack |
| 4 | Very Tacky/No Seal |
| 3 | 5 To 25% Seal |
| 2 | 25 To 50% Seal |
| 1 | 50 To 75% Seal |
| 0 | 75 To 100% Seal |

The coatings were dried for one week at room temperature, then evaluated for blocking under two conditions. The first condition involved placing 8.9×8.9 cm square samples in face-to-face relationship under a 500 g weight for one hour at room temperature, and the second condition involved placing 8.9×8.9 cm square samples in face-to-face relationship under a 500 g weight for one hour in a 49° C. oven. The results are shown below in Table 8:

TABLE 8

Latex Blocking Resistance

| Additives | Wt. % Additive Added Into Latex Base | Blocking Resistance, 1 hour at RT | Blocking Resistance, 1 hour at 49° C. |
|---|---|---|---|
| Base w/no metal driers | — | 10 | 10 |
| Base w/ metal driers | As in Example 5 | 10 | 10 |
| PEG400/ NOVEL 23E7 Ethoxylate | 2.5% each | 7 | 6 |
| Run No. 5-1 in base w/metal driers | 2% | 10 | 10 |
|  | 5% | 10 | 10 |
|  | 10% | 9 | 9 |
| Run No. 5-2 in base w/metal driers | 2% | 10 | 10 |
|  | 5% | 10 | 10 |
|  | 10% | 9 | 9 |
| Run No. 5-3 in base w/metal driers | 2% | 10 | 10 |
|  | 5% | 10 | 10 |
|  | 10% | 9 | 9 |
| Run No. 5-4 in base w/metal driers | 2% | 10 | 10 |
|  | 5% | 10 | 10 |
|  | 10% | 9.5 | 9 |
| Run No. 5-5 in base w/metal driers | 2% | 10 | 10 |
|  | 5% | 10 | 10 |
|  | 10% | 9 | 8 |
| Run No. 5-6 in base w/metal driers | 2% | 10 | 10 |
|  | 5% | 10 | 10 |
|  | 10% | 9 | 8 |
| Run No. 5-7 in base w/metal driers | 2% | 10 | 10 |
|  | 5% | 10 | 9 |
|  | 10% | 9 | 8 |
| Run No. 5-8 in base w/metal driers | 2% | 10 | 10 |
|  | 5% | 10 | 10 |
|  | 10% | 9 | 8 |

The results in Table 8 show very good blocking resistance, and a significant improvement over the blocking resistance obtained when using the conventional humectant/dispersant combination.

Example 9

Alkyd Blocking Test

Using the method of Example 8, the reactive liquid diluents of Example 5 were added to the Example 7 alkyd base paint and evaluated for blocking resistance. As was the case for Example 7, a metal drier package was already present in the base paint and thus additional metal driers were not added. The results are shown below in Table 9:

TABLE 9

Alkyd Blocking Resistance

| Additives | Wt. % Additive Added Into Alkyd Base | Blocking Resistance, 1 hour at RT | Blocking Resistance, 1 hour at 49° C. |
|---|---|---|---|
| None | — | 8 | 8 |
| PEG400/NOVEL 23E7 Ethoxylate | 2.5% each | 7 | 4 |
| Run No. 5-1 | 2% | 9 | 8 |
|  | 5% | 9 | 8 |
|  | 10% | 9 | 7 |

TABLE 9-continued

Alkyd Blocking Resistance

| Additives | Wt. % Additive Added Into Alkyd Base | Blocking Resistance, 1 hour at RT | Blocking Resistance, 1 hour at 49° C. |
|---|---|---|---|
| Run No. 5-2 | 2% | 9 | 9 |
|  | 5% | 9 | 9 |
|  | 10% | 9 | 8 |
| Run No. 5-3 | 2% | 9 | 8 |
|  | 5% | 9 | 8 |
|  | 10% | 9 | 8 |
| Run No. 5-4 | 2% | 9 | 9 |
|  | 5% | 9 | 9 |
|  | 10% | 9 | 8 |
| Run No. 5-5 | 2% | 9 | 8 |
|  | 5% | 9.5 | 7 |
|  | 10% | 9 | 5 |
| Run No. 5-6 | 2% | 9 | 8 |
|  | 5% | 9.5 | 8 |
|  | 10% | 9 | 7 |
| Run No. 5-7 | 2% | 9 | 8 |
|  | 5% | 9 | 8 |
|  | 10% | 9 | 7 |
| Run No. 5-8 | 2% | 9 | 8 |
|  | 5% | 9 | 8 |
|  | 10% | 9 | 8 |

The results in Table 9 show generally very good blocking resistance, and a significant improvement over the blocking resistance obtained when using the conventional humectant/dispersant combination.

Example 10

LTC Improvement

Crosslinking Molecule A was combined with various latex paints and found to reduce LTC and function as a coalescent. The LTC performance was equal to or better than several industry standard latex paint coalescents including dioctyl maleate, tributyl citrate, ethylene glycol monobutyl ether and TEXANOL ester alcohol. A comparison to TEXANOL ester alcohol was for example performed by formulating four exterior 50 g/L VOC latex paints having respective binder Tg values of 6° and 44° C. for the multistage latex binder used in Run No. 10-1, and 5°, 15°, and 22° C. for the single stage latex binders used in Run Nos. 10-2 through 10-4. The paints were combined with 2.6 Kg (5.75 lbs) of TEXANOL ester alcohol per 378.5 liters (100 gallons) of paint in Run No. 10-1, or with 2.6 Kg (5.75 lbs) of Crosslinking Molecule A per 378.5 liters (100 gallons) of paint in Run Nos. 10-2 through 10-4. Properties for the resulting paints are shown below in Table 10:

TABLE 10

|  | Run No. 10-1 | Run No. 10-2 | Run No. 10-3 | Run No. 10-4 |
|---|---|---|---|---|
| Binder Tg | 6/44° C. | 5° C. | 15° C. | 22° C. |
| TEXANOL ester alcohol, Kg/liter (lb/gal) | 0.0069 (0.0575) |  |  |  |
| Crosslinking Molecule A, Kg/liter (lb/gal) |  | 0.0069 (0.0575) | 0.0069 (0.0575) | 0.0069 (0.0575) |
| Finished Paint Density Kg/liter (lb/gal) | 1.05 (8.74) | 1.04 (8.69) | 1.05 (8.73) | 1.05 (8.75) |
| Low Temperature Coalescence | Pass | Pass | Pass | Fail |

TABLE 10-continued

|  | Run No. 10-1 | Run No. 10-2 | Run No. 10-3 | Run No. 10-4 |
|---|---|---|---|---|
| 60° Gloss | 72 | 70.2 | 72.1 | 70.8 |
| 60° Gloss | 91 | 81.1 | 85.9 | 88.9 |
| Scrub Resistance, ASTM D2486-06 | 878 | 1806 | 1049 | 1224 |

The TEXANOL ester alcohol level in the paint of Run No. 10-1 was at a recommended addition level in order to pass the LTC test. Use of the disclosed reactive liquid diluent in place of the conventional coalescent enabled passage of the LTC test using a binder having at least a 10° C. higher minimum Tg. Although the paint of Run No. 10-4 did not pass the LTC test at the reactive liquid diluent addition level employed, use of additional reactive liquid diluent should enable passage of the LTC test. As shown in Table 10, use of the reactive liquid diluent in the paints of Run Nos. 10-2 through 10-4 did not adversely impact gloss and scrub resistance properties compared to the paint of Run No. 10-1.

Example 11

Acrylic Urethane Coating

Using the method of Example 5, the reactive liquid diluents of Run Nos. 5-2, 5-4, 5-6 and 5-8 were added at 5 wt. % and 10 wt. % levels to 28.52 g of the Part A portion of BENJAMIN MOORE™ INSL-X V500.87 COROTECH™ Aliphatic Acrylic Urethane (a two-part product from Benjamin Moore & Co. supplied in Part A and Part B portions). The thus-modified Part A portion was combined with 6.4 g of the Part B portion. No metal drier package was employed. No separation or other mixing anomalies were noted. The resulting coating compositions and an unmodified sample of the mixed two-part acrylic urethane were drawn down as 0.10 mm (4 mil) thick films on aluminum panels. The drawdowns were allowed to cure for one week at room temperature and evaluated for appearance, methyl ethyl ketone (MEK) rub resistance and pencil hardness. No coating defects were observed in any of the cured coatings. The observed MEK and pencil hardness test results (101 double rubs and a 6H+ pencil hardness) were the same for all compositions including both the unmodified acrylic urethane and the compositions containing the reactive diluent.

Example 12

Epoxy Coating

Using the method of Example 11, the reactive liquid diluents of Run Nos. 5-2, 5-4, 5-6 and 5-8 were added at 5 wt. % and 10 wt. % levels to 15.90 g of the Part A Base portion of BENJAMIN MOORE INSL-X V400.87 COROTECH Polyamide Epoxy (a two-part product from Benjamin Moore & Co. supplied in Part A and Part B portions). The thus-modified Part A portion was combined with 15.7 g of the Part B Converter portion. No metal drier package was employed. No separation or other mixing anomalies were noted. The resulting coating compositions and an unmodified sample of the epoxy were drawn down as 0.08 mm (3 mil) thick films on aluminum panels. The drawdowns were allowed to cure for one week at room temperature and evaluated for appearance, methyl ethyl ketone (MEK) rub resistance and pencil hardness. No coating defects were observed in any of the cured coatings. The observed MEK and pencil hardness test results (101 double rubs and a 6H+ pencil hardness) were the same for all compositions including both the unmodified epoxy and the compositions containing the reactive diluent.

Example 13

Other Coating Compositions

Using the method of Examples 6 through 12, other commercially available coating compositions may be modified by employing the disclosed reactive liquid diluents in a colorant added at the point-of-sale or during in-plant manufacture of the coating composition. Coating compositions that may be so modified include the BEHR™, BEHR PRO™, MARQUEE™, PREMIUM PLUS™ and PREMIUM PLUS ULTRA™ interior and exterior product lines from Behr; the GLIDDEN™, DUO™, GRIPPER™, HIGH ENDURANCE™ PREMIUM™ and SPRED™ interior and exterior product lines from Glidden; the ASSURE™, OLYMPIC™, OLYMPIC ONE™, OLYMPIC HOME™ and OLYMPIC ICON interior and exterior product lines from PPG; and the INFINITY™, SHOWCASE™ and OVATION™ interior and exterior product lines from Sherwin-Williams. These paint and primer systems or their associated colorants may be modified by replacing all or a portion of the conventional coalescents or humectants they employ with the disclosed reactive liquid diluents. If not already present in the base paint or primer in sufficient amounts, metal driers or other catalysts like those used above may be added to facilitate the cure response of the reactive liquid diluent, and in some embodiments to also enhance or improve the properties of the cured paint films.

Example 14

Tinted Paints

Tinted paints were prepared by combining 1 g portions of the Run No. 3-3 through 3-5 black concentrates with 70 g of VALSPAR MEDALLION™ Satin Interior Pastel Base No. 3408 or with 70 g of VALSPAR ANTI-RUST ARMOR Interior/Exterior Oil Based Enamel Tint Base No. 21805. The tinted samples were shaken on a paint shaker for 3 minutes and 9 minutes, compared to determine the extent of color strength change and change in the CIELAB color parameter $\Delta E^*$, and then evaluated for color development using a standard rubup test. Minor color strength differences were measured when the samples shaken for 3 minutes and 9 minutes were analyzed using a spectrophotometer, but no visual difference was observed in the respective rubup samples. Set out below in Table 11 are the color strength ratios for each tinted paint (measured as the ratio of the color strength for the sample shaken 3 minutes divided by the color strength for the sample shaken 9 minutes), the $\Delta E^*$ value for the sample shaken 3 minutes compared to the sample shaken 9 minutes, and the appearance of the rubup samples:

TABLE 11

Tinted Paints

| Ingredient or Value | Run No. 3-3 Concentrate | Run No. 3-4 Concentrate | Run No. 3-5 Concentrate |
|---|---|---|---|
| Color Strength ratio, Latex Base | 98.97% | 99.38% | 95.92% |
| $\Delta E^*$, Latex Base | 0.39 | 0.25 | 1.32 |
| Rubup Color Development in Latex Base | Very Slight Light | Very Slight Light | Dark |
| Color Strength ratio, Enamel Base | 101.48 | 101.04 | 99.22 |
| $\Delta E^*$, Enamel Base | 0.55 | 0.38 | 0.14 |
| Rubup Color Development in Enamel Base | Very Slight Light | Very Slight Light | Slight Light |

The results in Table 11 show that the concentrates of Run Nos. 3-3 and 3-4 exhibited universal paint compatibility in latex and enamel paints, good color stability under varying shear conditions and minimal rubup. The concentrate of Run No. 3-5 exhibited good color stability under varying shear conditions and minimal rubup in an enamel paint.

Example 15

Colorants

The concentrates of Run Nos. 3-3 to 3-5 were let down with typical coating composition adjuvants to form fluid colorants. The results are shown below in Tables 12 and 13:

TABLE 12

Waterborne Colorants

| Ingredient or Value | Run No. 15-1 | Run No. 15-2 | Run No. 15-3 |
|---|---|---|---|
| Run No. 3-3 Concentrate | 50 | | |
| Run No. 3-4 Concentrate | | 50 | |
| Run No. 3-5 Concentrate | | | 50 |
| Nonionic Surfactant | 10.62 | 10.62 | 10.62 |
| Anionic Surfactant | 5.38 | 5.38 | 5.38 |
| Anionic Surfactant | 1.21 | 1.21 | 1.21 |
| Water | 35.71 | 35.71 | 35.71 |
| Total | 102.92 | 102.92 | 102.92 |
| Colorant Viscosity, (kU) | 140+ | 140+ | 140+ |

TABLE 13

Solvent-Borne Colorants

| Ingredient or Value | Run No. 15-4 | Run No. 15-5 | Run No. 15-6 |
|---|---|---|---|
| Run No. 3-3 Concentrate | 50 | | |
| Run No. 3-4 Concentrate | | 50 | |
| Run No. 3-5 Concentrate | | | 50 |
| Dispersant | 6.38 | 6.38 | 6.38 |
| Dispersant | 0.6 | 0.6 | 0.6 |
| Cationic Polymer | 0.11 | 0.11 | 0.11 |
| Propylene Glycol Monomethyl Ether Acetate | 13 | 13 | 13 |
| Total | 70.09 | 70.09 | 70.09 |
| Colorant Viscosity, (kU) | 64 | 65 | 63 |

The Table 13 and Table 14 colorants exhibited good letdown characteristics. The Table 13 colorants were thick but pumpable fluids. The Table 14 colorants were fluids of lower viscosity.

Example 16

Colorant Array

A commercially-available 14 colorant array was modified by adding 10 wt. % of Crosslinking Molecule A to each colorant in the array. The colorants contained conventional dispersants, extenders, surfactants, defoamers and preservatives, together with pigments in the amounts shown below in Table 14. The modified colorants were ground using zirconium mill beads to a 7 Hegman fineness of grind value. The modified colorant viscosities were evaluated using a BROOKFIELD KU+ viscometer, and the modified colorant drying times were evaluated using the sand trail test described in U.S. Pat. No. 8,822,580 B2 (Korenkiewicz et al.). The results are shown below in Table 14:

TABLE 14

| Colorant Hue | Pigment | Wt. % Pigment | Viscosity (KU) | Sand Trail Time |
|---|---|---|---|---|
| White | PW6 | 55.43 | 115 | >24 Hours |
| Black | PBK7 | 8.95 | 68 | >24 Hours |
| Organic Yellow | PY74 | 32.26 | 134 | >24 Hours |
| Medium Yellow | PY74 + PY83 | 37.14 | 140+ | <1 Hour |
| Durable Yellow | PY74 + PY184 | 52.14 | 131 | <1 Hour |
| Green | PG7 | 19.97 | 134 | >24 Hours |
| Blue | PB15:2 | 14.38 | 121 | >24 Hours |
| Interior Red | PR112 | 10.97 | 95 | >24 Hours |
| Exterior Red | PR254 | 14.80 | 81 | >24 Hours |
| Magenta | PR122 | 15.17 | 125 | >24 Hours |
| Orange | PO73 | 25.31 | 98 | <1 Hour |
| Yellow Oxide | PY42 | 55.36 | 111 | <1 Hour |
| Red Oxide | PR101 | 62.39 | 140+ | >24 Hours |
| Raw Umber | PBR7 | 19.91 | 132 | >24 Hours |

Sand trail Times greater than 24 hours are desirable, and indicate the colorant should not cause dispenser tip plugging in automated or manual colorant dispensing equipment during periods when the dispenser is idle (e.g., overnight or during holidays). For the array of unmodified commercial colorants on which the above formulations were based, only the white colorant exhibited a Sand Trail Time greater than 24 hours, with all other colorants in the array exhibiting Sand Trail Times less than 1 hour. The modified colorant array provided a significant reduction in potential dispenser tip plug formation in all except the medium yellow, durable yellow, yellow oxide and orange colorants. The Sand Trail Times for these latter colorants could be improved by increasing the reactive liquid diluent content, or by including a scaffold molecule in the reactive liquid diluent. This was demonstrated for the yellow oxide colorant by increasing its Crosslinking Molecule A level from 10 wt. % to 30 wt. % of the total colorant weight. Doing so increased the Sand Trail Time to more than 24 hours. A similar modification should provide Sand Trail Times greater than 24 hours for the medium yellow, durable yellow and orange colorants.

Custom-tinted paints were prepared by mixing the modified colorants with pastel and clear bases using an automated colorant dispenser capable of dispensing a 1/384 fluid ounce (0.077 cm$^3$) minimum dispensing quantity. The modified colorants were universal colorants compatible with both solvent- and water-based paints and coatings.

The modified colorants could be further modified by adding the disclosed metal drier package to each colorant. The metal drier could also or instead be incorporated in the base paint, or dispensed from a separate dispenser canister containing the metal drier package and optionally further containing a suitable prime pigment (e.g., titanium dioxide, to provide additional hiding) or an extender pigment (e.g., talc, kaolin clay, calcium carbonate or other conventional extender). Inclusion of the metal drier package would assist in cured film formation and help reinforce or enhance rather than detract from the performance of the final cured coating composition film.

Example 17

UV Curing Wood Coating

UV cure wood stain compositions typically employ a UV curable colorant. A wood stain formulation may be made by mixing the ingredients shown below in Table 15:

TABLE 15

| Ingredient | Amount, Parts |
|---|---|
| Dipropyleneglycol Diacrylate (DPGDA) Monomer | 45 |
| SOLMER ™ SE1500 Oligomer | 45 |
| IRGACURE 369 Photoinitiator | 5 |
| Pigment Dispersion containing 30 wt. % carbon black in Crosslinking Molecule B | 5 |

The formulation shown in Table 15 should provide comparable appearance and performance to a conventional stain formulation using the same amount of a UV curable colorant such as PENN COLOR™ Black 9B1.

Example 18

Evaluation of High Viscosity Reactive Surfactants

Five commercially available E-SPERSE™ reactive surfactants for use in emulsion polymerization were obtained from Ethox Chemicals, LLC. The reported descriptions and functionalities for these surfactants are shown below in Table 16. Their measured viscosities are also shown in Table 16. The first four listed surfactants are reported to contain 99% solids. The last listed surfactant is reported to contain only 50% solids, and if measured without its carrier should have a viscosity well above 1,000 cps.

TABLE 16

| Surfactant | Description | No. of Functional Groups | Viscosity Spindle | RPM | cps |
|---|---|---|---|---|---|
| E-SPERSE RS-1596 | Anionic, Sulfate, NH$_4^+$ Salt | One | 7 | 20 | 28000 |
| E-SPERSE RS-1616 | Nonionic | One | 5 | 20 | 5820 |
| E-SPERSE RS-1617 | Nonionic | Two | 5 | 20 | 3960 |
| E-SPERSE RS-1618 | Anionic, Sulfate, NH$_4^+$ Salt | Two | 7 | 20 | 33400 |
| E-SPERSE RS-1684 | Anionic, Phosphate, NH$_4^+$ Salt (50% solids) | Two | 3 | 20 | 630 |

Varying amounts of Crosslinking Molecule A, Scaffold Molecule G and the Table 16 surfactants were combined with the metal drier package (4.5 wt. % BORCHI Oxy-Coat 1310 metal catalyst and 1.875 wt. % NUXTRA Zirconium 24%) used in Example 3, and mixed to provide clearcoat compositions. Drawdowns were prepared on unprimed aluminum substrates using a 16 gauge wire rod. The drawdowns were allowed to air dry and evaluated for cure over a one month period, using a five point scale in which a value of 1 represents a wet coating, 2 represents a very tacky coating, 3 represents a slightly tacky coating, 4 represents a coating that is tack-free but may be indented with a fingernail, and 5 represents a coating that is tack-free and not indentable with a fingernail. After one month, several of the cured samples were evaluated for pencil hardness and for rub resistance using methyl ethyl ketone (MEK). Set out below in Tables and 18 are the ingredients in each composition and the observed cure results:

Example 19

Functional Group Evaluation

A series of reactive liquid diluent molecular species having varying numbers of allyl ether functional groups were combined with a metal drier package containing 4.5 wt. % BORCHI Oxy-Coat 1101 metal catalyst and 1.875 wt.

TABLE 17

| Ingredient | Run 18-1 | Run 18-2 | Run 18-3 | Run 18-4 | Run 18-5 | Run 18-6 |
|---|---|---|---|---|---|---|
| Crosslinking Molecule A | 16.75 | 16.75 | 16.75 | 16.75 | 16.75 | 16.75 |
| Scaffold Molecule G | 8.25 | | | | | |
| E-SPERSE RS-1596 | | 8.25 | | | | |
| E-SPERSE RS-1616 | | | 8.25 | | | |
| E-SPERSE RS-1617 | | | | 8.25 | | |
| E-SPERSE RS-1618 | | | | | 8.25 | |
| E-SPERSE RS-1684 | | | | | | 8.25 |
| Total | 25 | 25 | 25 | 25 | 25 | 25 |
| Cure State At: | | | | | | |
| 2 days | 1 | 1 | 1 | 1 | 1 | 1 |
| 3 Days | 3 | 1 | 1 | 1 | 1 | 1 |
| 6 Days | 5 | 4 | 2 | 2 | 4 | 1 |
| 8 Days | 5 | 4 | 3 | 3 | 4 | 2 |
| 23 Days | 5 | 5 | 3 | 3 | 5 | 5 |
| 28 Days | 5 | 5 | 3 | 3 | 5 | 5 |
| 31 Days | 5 | 5 | 3 | 3 | 5 | 5 |
| Pencil Hardness | 6H+ | 3H-4H | | | 3H-4H | 3H-4H |
| MEK Rubs | 101+ | 7 | | | 5 | 36 |

TABLE 18

| Ingredient | Run 18-7 | Run 18-8 | Run 18-9 | Run 18-10 | Run 18-11 | Run 18-12 | Run 18-13 |
|---|---|---|---|---|---|---|---|
| Crosslinking Molecule A | 25 | | | | | | |
| Scaffold Molecule G | | 25 | | | | | |
| E-SPERSE RS-1596 | | | 25 | | | | |
| E-SPERSE RS-1616 | | | | 25 | | | |
| E-SPERSE RS-1617 | | | | | 25 | | |
| E-SPERSE RS-1618 | | | | | | 25 | |
| E-SPERSE RS-1684 | | | | | | | 25 |
| Total | 25 | 25 | 25 | 25 | 25 | 25 | 25 |
| Cure State At: | | | | | | | |
| 2 days | 1 | 3 | 1 | 1 | 1 | 1 | 1 |
| 3 Days | 1 | 4 | 1 | 1 | 1 | 1 | 1 |
| 6 Days | 3 | 5 | 2 | 1 | 1 | 1 | 1 |
| 8 Days | 5 | 5 | 2 | 1 | 1 | 1 | 1 |
| 23 Days | 5 | 5 | 2 | 1 | 2 | 2 | 1 |
| 28 Days | 5 | 5 | 2 | 1 | 2 | 2 | 1 |
| 31 Days | 5 | 5 | 2 | 1 | 2 | 2 | 1 |
| Pencil Hardness | 6H+ | 3H-4H | | | | | |
| MEK Rubs | 101+ | 101+ | | | | | |

The results in Tables 17 and 18 show that compositions containing the disclosed reactive liquid diluent provided earlier hardened film development and more complete cure than compositions containing only the commercial reactive surfactants. This difference is believed to be due to insufficient functionality, too high an equivalent weight per reactive site or excessive viscosity in the commercial reactive surfactants.

% NUXTRA Zirconium 24%, mixed to provide clearcoat compositions, applied as drawdowns on unprimed aluminum substrates using a 16 gauge wire rod, allowed to air dry and evaluated for cure using a five point scale in which a value of 1 represents a wet coating, 2 represents a very tacky coating, 3 represents a slightly tacky coating, 4 represents a coating that is tack-free but soft and easily to mar, and 5 represents a coating that is a tack-free hard film resistant to more than 100 MEK rubs. A 5 rating accordingly used more stringent criteria than were used in Examples 3 and 18. The molecular species employed and their calculated molecular weight, measured viscosity and allyl ether functionality are shown below in Table 19 together with the observed cure ratings:

TABLE 19

| Molecular species | Molecular Weight | Viscosity, cps | Allyl Ether Functionality | Cure Rating | | | | |
|---|---|---|---|---|---|---|---|---|
| | | | | 3 days | 5 days | 7 days | 10 days | 30 days |
| Crosslinking Molecule A | 510 | 94 | 4 | 1 | 2 | 5 | 5 | 5 |
| Scaffold Molecule G | 907 | 275 | 4 | 2 | 3 | 4 | 5 | 5 |
| Scaffold Molecule M | 1083 | 235 | 4 | 2 | 3 | 4 | 4 | 4 |
| Scaffold Molecule N | 991 | 2100 | 3 | 2 | 2 | 3 | 3 | 3 |
| Scaffold Molecule O | 1039 | 1425 | 3 | 2 | 2 | 2 | 3 | 3 |
| Scaffold Molecule P | 949 | 2900 | 2 | 2 | 2 | 2 | 2 | 2 |
| Scaffold Molecule Q | 997 | 1400 | 2 | 2 | 2 | 2 | 2 | 2 |
| Scaffold Molecule A | 1116 | 95 | 2 | 1 | 1 | 1 | 1 | 1 |
| Scaffold Molecule L | 1278 | 193 | 1 | 1 | 1 | 1 | 1 | 1 |

The results in Table 19 show that molecular species containing four functional groups provided better cure characteristics than molecular species containing three or fewer functional groups. Molecular species containing only three functional groups formed dry but slightly tacky films, and should provide a reduction in VOCs compared to cured films containing a nonreactive diluent. Harder film properties may be obtained by employing a trifunctional molecular species having a lower equivalent weight per functional group than those shown in Table 19, by adding an additional catalyst to supplement the metal drier employed, or by adding an additional crosslinker.

Having thus described preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

We claim:

1. A reactive liquid diluent comprising one or more molecular species having at least three reactive unsaturated sites, wherein the molecular species have a molar equivalent weight per reactive unsaturated site that is less than 500 grams, wherein the one or more molecular species are at least 60 wt. % of the reactive liquid diluent, and wherein the reactive liquid diluent has a viscosity less than 1,000 cps and is nonvolatilizing, wherein the reactive liquid diluent includes a molecular species having a linear polyoxyethylene segment joined by one or more ester linkages to one or more pendant unsaturated fatty acid residues.

2. The reactive liquid diluent of claim 1, wherein the reactive liquid diluent comprises a single molecular species having at least three reactive unsaturated sites.

3. The reactive liquid diluent of claim 1, wherein at least one reactive unsaturated site comprises (meth)allyl ether groups, vinyl ether groups, or (meth)acrylate groups.

4. The reactive diluent of claim 1, wherein at least one reactive unsaturated site is a conjugated or unconjugated double bond.

5. The reactive liquid diluent of claim 1, wherein the reactive liquid diluent has a viscosity less than 500 cps.

6. The reactive liquid diluent of claim 1, wherein the reactive liquid diluent is configured to form an interpenetrating polymer network in a cured film-forming polymeric binder.

7. The reactive liquid diluent of claim 1, wherein the reactive liquid diluent is configured to crosslink with a film-forming polymeric binder.

8. A reactive dispersing agent for dispersing solid pigment particles, the reactive dispersing agent including one or more molecular species having at least three reactive unsaturated sites, wherein the molecular species have a number average molar equivalent weight per reactive unsaturated site that is less than 500 grams, and wherein the one or more molecular species are at least 60 wt. % of the reactive dispersing agent, and wherein the reactive dispersing agent has a viscosity less than 1,000 cps and is nonvolatilizing, and wherein the reactive dispersing agent includes one or more hydrophilic segments, wherein a molecular species in the reactive dispersing agent contains up to 15 alkyleneoxy units.

9. The reactive liquid diluent of claim 1, wherein a molecular species in the reactive liquid diluent contains up to 15 alkyleneoxy units.

10. The reactive dispersing agent of claim 8, wherein the reactive dispersing agent includes a molecular species having a linear polyoxyethylene segment joined by one or more ester linkages to one or more pendant unsaturated fatty acid residues.

11. The reactive dispersing agent of claim 8, further comprising solid pigment particles dispersed therein, where in the solid pigment particles comprise titanium dioxide, black iron oxide, red iron oxide, transparent red oxide, yellow iron oxide, transparent yellow oxide, brown iron oxide, zinc oxide, magnesium silicate, calcium carbonate, aluminosilicate, silica, clay, carbon black, lampblack, phthalocyanine green, phthalocyanine blue, naphthol red, quinacridone red, toulidine red, DPP red, quinacridone magenta, quinacridone violet, carbazole violet, DNA orange, DPP orange, monoazo yellow, bismuth vanadate, umber, or complex inorganic color pigments.

12. A paint or coating composition comprising one or more film-forming polymeric binders and a reactive liquid diluent including one or more molecular species having at least three reactive unsaturated sites, wherein the molecular species have a molar equivalent weight per reactive unsaturated site that is less than 500 grams, wherein the one or more molecular species are at least 60 wt. % of the reactive liquid diluent, and wherein the reactive liquid diluent has a viscosity less than 1,000 cps and is nonvolatilizing.

13. The paint or coating composition of claim 12, wherein the one or more film-forming polymeric binders include an acrylic polymer, a styrene acrylic copolymer, a vinyl acetate polymer, a vinyl acetate copolymers, a vinyl versatic acid ester acrylic copolymer, an ethylene vinyl acetate copolymer, a styrene butadiene copolymer, a polyester, an alkyd resin, a drying oil modified polymer, a polyurethane, a polyamide, an epoxy ester, a polyurea, a polyurethane dispersion, a polysiloxane, a silicone, a fluorinated polymer, or a vinylidene fluoride polymer.

14. The paint or coating composition of claim 12, wherein the polymeric binder has a glass transition temperature of between about −130° C. and about 350° C.

15. The paint or coating composition of claim 12, wherein the polymeric binder is about 5 to about 90 volume percent of dried coating volume.

16. The paint or coating composition of claim 12, wherein the paint or coating composition has a pigment volume concentration of about 0.1 to about 95 volume percent.

17. The paint or coating composition of claim 12, wherein the paint or coating composition has a viscosity of about 10 cps to about 100,000 cps.

18. The paint or coating composition of claim 12, wherein the composition contains less than 10 g/L volatile organic compounds.

19. The paint or coating composition of claim 12, wherein the paint or coating composition further includes one or more of a biocide, a coalescent, a cosolvent, a curing indicator, a defoamer, a fungicide, a heat stabilizer, a leveling agent, a light stabilizer, a mildewcide, an optical brightener, a preservative, a surfactant, an ultraviolet light absorber, or a wax.

20. A paint or coating composition comprising one or more film-forming polymeric binders and a reactive dispersing agent for dispersing solid pigment particles, the dispersing agent comprising one or more molecular species having at least three reactive unsaturated sites, wherein the molecular species have a molar equivalent weight per reactive unsaturated site that is less than 500 grams, and wherein the one or more molecular species are at least 60 wt. % of the reactive dispersing agent, and wherein the reactive dispersing agent has a viscosity less than 1,000 cps and is non-volatilizing, and wherein the reactive dispersing agent includes one or more hydrophilic segments.

21. The paint or coating composition of claim 20, wherein a molecular species in the reactive dispersing agent includes up to 15 alkyleneoxy units.

22. The paint or coating composition of claim 20, wherein the reactive dispersing agent comprises a molecular species having a linear polyoxyethylene segment joined by one or more ester linkages to one or more pendant unsaturated fatty acid residues.

23. The paint or coating composition of claim 20, further comprising solid pigment particles dispersed therein, wherein the solid pigment particles comprise titanium dioxide, black iron oxide, red iron oxide, transparent red oxide, yellow iron oxide, transparent yellow oxide, brown iron oxide, zinc oxide, magnesium silicate, calcium carbonate, aluminosilicate, silica, clay, carbon black, lampblack, phthalocyanine green, phthalocyanine blue, naphthol red, quinacridone red, toulidine red, DPP red, quinacridone magenta, quinacridone violet, carbazole violet, DNA orange, DPP orange, monoazo yellow, bismuth vanadate, umber, or complex inorganic color pigments.

24. The paint or coating composition of claim 20, wherein the one or more film-forming polymeric binders include an acrylic polymer, a styrene acrylic copolymer, a vinyl acetate polymer, a vinyl acetate copolymers, a vinyl versatic acid ester acrylic copolymer, an ethylene vinyl acetate copolymer, a styrene butadiene copolymer, a polyester, an alkyd resin, a drying oil modified polymer, a polyurethane, a polyamide, an epoxy ester, a polyurea, a polyurethane dispersion, a polysiloxane, a silicone, a fluorinated polymer, or a vinylidene fluoride polymer.

25. The paint or coating composition of claim 20, wherein the composition contains less than 10 g/L volatile organic compounds.

* * * * *